(12) United States Patent
Park et al.

(10) Patent No.: US 11,709,555 B2
(45) Date of Patent: Jul. 25, 2023

(54) SMART PEN AND A DISPLAY DEVICE USING THE SAME

(71) Applicant: SAMSUNG DISPLAY CO., LTD., Yongin-si (KR)

(72) Inventors: Won Sang Park, Yongin-si (KR); Ju Yeon Kim, Asan-si (KR); Chang Min Park, Gwangmyeong-si (KR); Chang Woo Shim, Cheonan-si (KR); Gi Na Yoo, Cheonan-si (KR); Seong Jun Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/715,464

(22) Filed: Apr. 7, 2022

(65) Prior Publication Data

US 2023/0083248 A1     Mar. 16, 2023

(30) Foreign Application Priority Data

Sep. 16, 2021   (KR) .......................... 10-2021-0123588

(51) Int. Cl.
   *G06F 3/0354*   (2013.01)
   *G06F 3/041*    (2006.01)
   *G06F 3/038*    (2013.01)

(52) U.S. Cl.
   CPC ........ *G06F 3/03542* (2013.01); *G06F 3/0383* (2013.01); *G06F 3/041* (2013.01)

(58) Field of Classification Search
   CPC ............ G06F 3/03545; G06F 3/03542; G06F 3/0321; G06F 3/0317
   See application file for complete search history.

(56) References Cited

U.S. PATENT DOCUMENTS

| | | | |
|---|---|---|---|
| 6,548,768 B1 | 4/2003 | Pettersson et al. | |
| 9,068,845 B2 | 6/2015 | Geaghan et al. | |
| 9,323,355 B2 * | 4/2016 | Arends | G06F 3/03545 |
| 9,378,444 B2 | 6/2016 | Knee et al. | |
| 9,557,827 B2 | 1/2017 | Geaghan et al. | |
| 2012/0162145 A1 | 6/2012 | Knee et al. | |
| 2012/0249490 A1 | 10/2012 | Lee et al. | |
| 2013/0321357 A1 | 12/2013 | Yamada et al. | |

(Continued)

FOREIGN PATENT DOCUMENTS

| | | |
|---|---|---|
| CN | 100346276 | 10/2007 |
| JP | 2010-026693 | 2/2010 |

(Continued)

OTHER PUBLICATIONS

Extended European Search Report issued in corresponding European Patent Appln No. EP22183267.8 dated Jan. 2, 2023.

*Primary Examiner* — Koosha Sharifi-Tafreshi
(74) *Attorney, Agent, or Firm* — F. Chau & Associates, LLC

(57)   ABSTRACT

A smart pen including: a body part; a nib part at an end of the body part; a code detection unit for receiving light reflected from a display panel and the nib part, wherein the light reflected from the display panel and the nib part is used to detect shape data for code patterns of the display panel; and a code processor for generating coordinate data based on the shape data and transmitting the coordinate data to a main processor for driving the display panel based on the coordinate data.

21 Claims, 19 Drawing Sheets

(56) References Cited

U.S. PATENT DOCUMENTS

2015/0035811 A1* 2/2015 Yamada ................ G06F 3/0321
345/179
2019/0302900 A1* 10/2019 Lin ..................... G06F 3/03542

FOREIGN PATENT DOCUMENTS

| KR | 20-0485305 | 12/2017 |
| KR | 10-2047021 | 11/2019 |
| WO | 2013-090494 | 6/2013 |

* cited by examiner

FIG. 15

|  | Col1 | Col2 | Col3 | Col4 | Col5 | Col6 |  |
|---|---|---|---|---|---|---|---|
| DC11 → | 00 | 01 | 01 (DC23) | 11 | 10 | 11 (DC16) | — Row1 |
|  | 00 | 01 | Null | 10 | 00 | 10 | — Row2 |
|  | 01 | 01 | 01 | 01 | Null | 10 | — Row3 |
|  | 01 | 10 | 00 | 00 | 01 | 11 | — Row4 |
|  | 01 | 01 | 00 | 10 | 01 | 11 | — Row5 |
| DC61 → | 01 | 10 (DC62) | 11 | 11 | 11 | 01 (DC66) | — Row6 |

|  | Col1 | Col2 | Col3 | Col4 | Col5 |  |
|---|---|---|---|---|---|---|
| Data 1 | 1 | 0 | 1 | 1 | 0 | Row1 |
|  | 1 | 1 | 0 | 1 | 1 | Row2 |
| Data 2 | 1 | 0 | 1 | 0 | 1 | Row3 |
|  | 0 | 1 | 1 | 1 | 0 | Row4 |

| | | | |
|---|---|---|---|
| RP1 | 01 | 10 | ----- Row1 |
| 01 | 00 | 11 | ----- Row2 |
| RP2 | 11 | 01 | ----- Row3 |
| 01 | 00 | 10 | ----- Row4 |

Data 1: Row1, Row2
Data 2: Row3, Row4

Col1   Col2   Col3

RP: RP1, RP2

SMART PEN AND A DISPLAY DEVICE USING THE SAME

CROSS-REFERENCE TO RELATED APPLICATION

This application claims priority under 35 U.S.C. § 119 to Korean Patent Application No. 10-2021-0123588, filed on Sep. 16, 2021, the disclosure of which is incorporated by reference herein in its entirety.

1. TECHNICAL FIELD

The present disclosure relates to a smart pen and a display device using the same.

2. DESCRIPTION OF THE RELATED ART

A display device, which is an output device for displaying images, is experiencing increased demand in a variety of fields. For example, display devices have been applied to various electronic devices such as smart phones, digital cameras, notebook computers, navigation systems, and smart televisions. Examples of display devices include flat panel display devices such as a liquid crystal display (LCD) device, a field emission display (FED) device, or an organic light-emitting diode (OLED) display device. The OLED display device, in particular, includes light-emitting elements, which can allow pixels of a display panel to emit light, and can thus display an image without the aid of a backlight unit that provides light to the display panel. In other words, the OLED display device is a self-emissive type display device.

Recent display devices support touch input made with parts of the human body (e.g., a finger) and touch input made with an electronic pen. However, touch input made with an electronic pen and can be more precisely sensed by a display device than touch input made with part of the human body.

SUMMARY

Embodiments of the present disclosure provide a smart pen capable of improving the rate of recognition of code patterns and code information of a display panel by minimizing the loss of light, caused by the reflection of light near the nib of the smart pen, and a display device using the smart pen.

Embodiments of the present disclosure also provide a smart pen capable of generating touch coordinate data using code patterns of a display panel, without the need of complicated computation and correction, and performing touch input and a display device using the smart pen.

According to an embodiment of the present disclosure, a smart pen including: a body part; a nib part at an end of the body part; a code detection unit for receiving light reflected from a display panel and the nib part, wherein the light reflected from the display panel and the nib part is used to detect shape data for code patterns of the display panel; and a code processor for generating coordinate data based on the shape data and transmitting the coordinate data to a main processor for driving the display panel based on the coordinate data.

The code detection unit includes a light emitter, which emits infrared (IR) light using at least one IR light source, and a light receiver, which detects IR light, reflected from the code patterns of the display panel, via an IR camera.

The code processor extracts or generates data codes corresponding to a structure or shape of the code patterns from a memory, combines the data codes, and extracts or generates coordinate data corresponding to the combined data codes.

The memory stores the data codes and coordinate data for combinations of the data codes.

The nib part includes a reflective surface.

The reflective surface is formed in the shape of an inverted triangle, a polygon of than the inverted triangle, a circle, an ellipse, or a nib of a fountain pen.

The nib part includes a hole for outputting infrared (IR) light emitted from the code detection unit and receiving light reflected from the reflective surface.

The reflective surface is an IR reflector or is coated with an IR reflector.

A reflective width of the reflective surface of the nib part is the same as, or greater than, a thickness or width of the body part.

The reflective surface of the nib part includes a first reflective surface, which has a concave surface with a first curvature, and a second reflective surface, which has a concave surface with a second curvature greater than the first curvature.

A reflective width of the first reflective surface is the same as, or greater than, a thickness or width of the body part.

The reflective surface of the nib part is an IR reflector or is coated with an IR reflector.

According to an embodiment of the present disclosure, a display device includes: a display panel including code patterns; a main processor for driving the display panel to display an image; and a smart pen for receiving light reflected from the display panel to detect shape data for the code patterns, the smart pen generating coordinate data for the shape data and transmitting the coordinate data to the main processor.

The smart pen includes a body part, a nib part formed at an end of the body part, a code detection unit for receiving the light reflected from the display panel and light reflected from the nib part to detect the shape data for the code patterns, and a code processor for generating the coordinate data based on the shape data and transmitting the coordinate data to the main processor.

The nib part includes a reflective surface.

The reflective surface is formed in the shape of an inverted triangle, a polygon other than the inverted triangle, a circle, an ellipse, or a nib of a fountain pen.

The display panel includes a plurality of touch electrodes for detecting touch input and a code pattern part which includes code patterns obtained by cutting at least some of the touch electrodes in accordance with a predefined set of criteria to have location information.

The code pattern part includes a reference point, which is used to identify the code pattern part, a first reference line, which extends in a first direction from the reference point, and a second reference line, which extends in a second direction, intersecting the first direction, from the reference point, and the code patterns are disposed in an area formed by the first and second reference lines.

The reference point corresponds to a cutout at an intersection between the at least some of the touch electrodes.

The first reference line is formed by connecting a plurality of intersection points that are arranged in the first direction with respect to the reference point.

According to an embodiment of the present disclosure, an electronic pen includes: a body part; a nib part at an end of the body part, the nib part including a reflective surface and an opening; a code detection unit for receiving light reflected from a display panel and the reflective surface of the nib through the opening, wherein the code detection unit generates generate shape data of code patterns in the display panel based on the light reflected from the display panel and the reflective surface; and a code processor for generating coordinate data based on the shape data and transmitting the coordinate data to a main processor for driving the display panel based on the coordinate data.

The code detection unit outputs light to the display panel through the opening of the nib part.

The opening is spaced apart from a tip of the nib part.

According to an embodiment of the present disclosure, the smart pen and the display device can receive coordinate data generated using data codes, without a requirement of a complicated computation/correction process, the display device can reduce cost and power consumption and can simplify a driving process thereof.

According to an embodiment of the present disclosure, the smart pen and the display device using the same may increase the recognition rate of a code pattern and code information of a display panel, thereby improving user satisfaction and reliability.

BRIEF DESCRIPTION OF THE DRAWINGS

The above and other features of the present disclosure will become more apparent by describing in detail embodiments thereof with reference to the attached drawings, in which:

FIG. 15 is a table showing data codes corresponding to the code pattern part of FIG. 14;

FIG. 17 is a table showing data codes corresponding to the code pattern part of FIG. 16;

FIG. 19 is a table showing data codes corresponding to the code pattern part of FIG. 16.

DETAILED DESCRIPTION OF THE EMBODIMENTS

The present disclosure will now be described more fully hereinafter with reference to the accompanying drawings, in which embodiments thereof are shown. This disclosure may, however, be embodied in different forms and should not be construed as limited to the embodiments set forth herein.

It will be understood that when a layer, component, etc. is referred to as being "on" another layer, component, etc., it can be directly on the other layer, component, etc, or intervening layers, components, etc. may also be present. The same reference numbers may indicate the same elements throughout the specification.

It will be understood that, although the terms "first," "second," etc. may be used herein to describe various elements, and these elements should not be limited by these terms. For example, these terms are used to distinguish one element from another element. For instance, a first element discussed below could be termed a second element. Similarly, the second element could also be termed the first element.

Each of the features of the various embodiments of the present disclosure may be combined or combined with each other, in part or in whole. In addition, each embodiment of the present disclosure may be implemented independently of each other or may be implemented together in an association.

Hereinafter, embodiments of the present disclosure will be described in detail with reference to the accompanying drawings.

Figure 1:
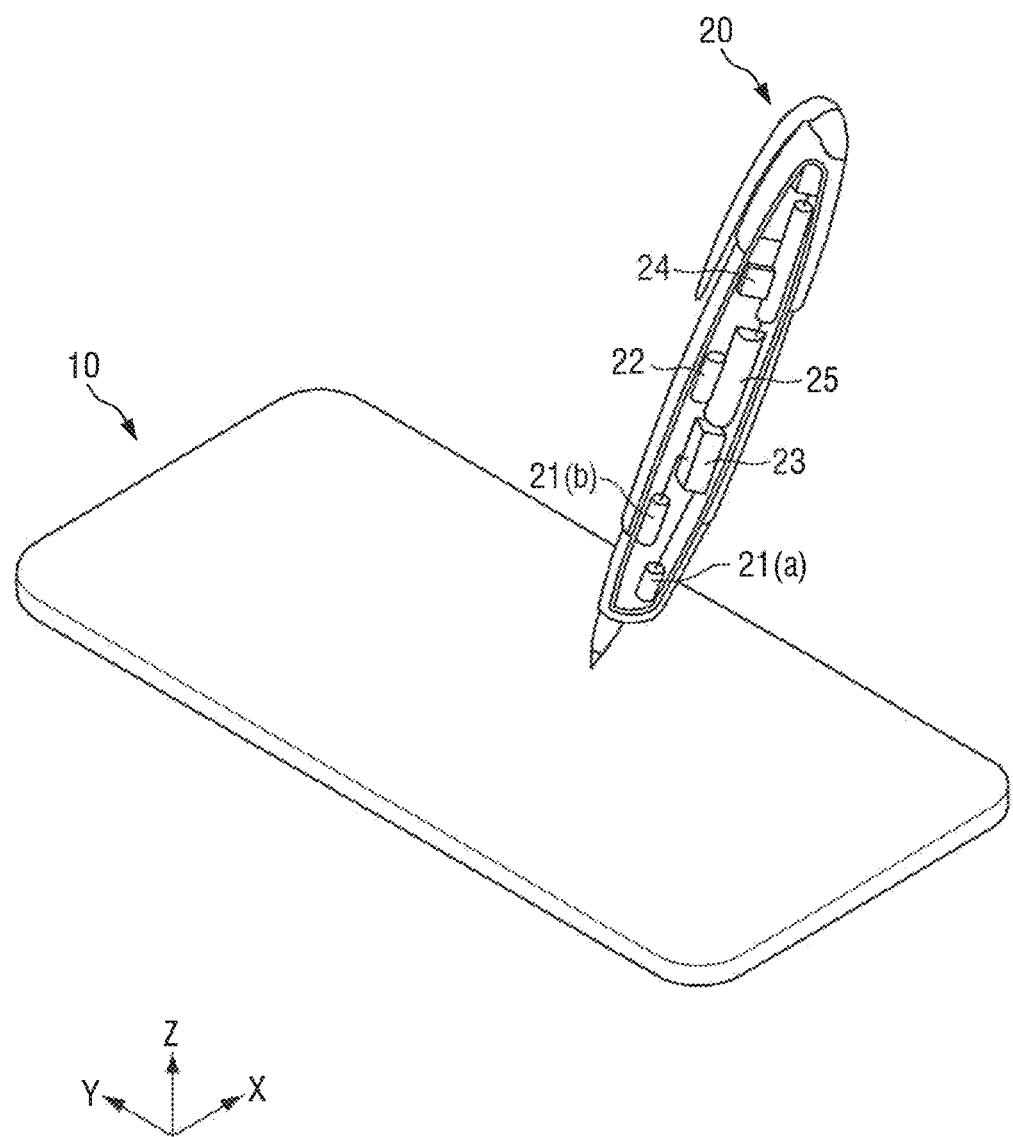
FIG. 1 illustrates a smart pen and a display device according to an embodiment of the present disclosure.
Figure 2:
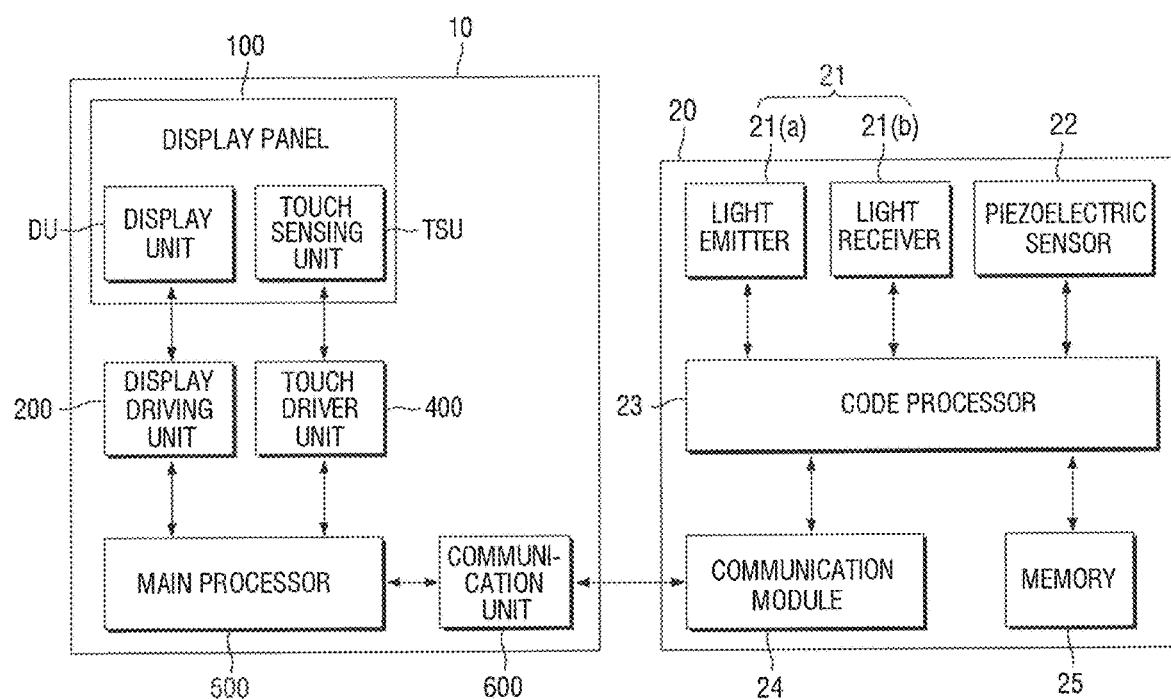
FIG. 2 is a block diagram of the smart pen and the display device of FIG. 1.

FIG. 1 illustrates a smart pen and a display device according to an embodiment of the present disclosure. FIG. 2 is a block diagram of the smart pen and the display device of FIG. 1.

Referring to FIGS. 1 and 2, a display device 10 includes a display panel 100, a display driving unit 200, a touch driving unit 400, a main processor 500, and a communication unit 600. A smart pen 20 includes a code detection unit 21, a piezoelectric sensor 22, a code processor 23, a communication module 24, and a memory 25. The smart pen 20 (particularly, a body part and a nib part of the smart pen 20) may be formed in the shape of a writing instrument such as a fountain pen.

The smart pen 20, which is an electronic pen capable of detecting light displayed by, or reflected from, the display panel 100, may detect code patterns included in the display panel 100 and generate coordinate data based on the detected light. The smart pen 20 may be an electronic pen in the form of a writing instrument, but the present disclosure is not limited thereto.

The display device 10 uses the smart pen 20 as a touch input tool. The display panel 100 of the display device 10 may include a display unit DU, which displays an image, and a touch sensing unit TSU, which detects a body part such as a finger and the smart pen 20. The display unit DU may include a plurality of pixels and may display an image via pixels. The display unit DU may display an image including code patterns via the pixels.

The touch sensing unit TSU may include a plurality of touch electrodes and may detect touch input from a user in a capacitive manner. At least some of the touch electrodes may include a code pattern part and may thus be able to detect touch input from the smart pen 20.

The code pattern part of the display panel 100 may include code patterns, which are cut in accordance with a predetermined set of criteria and have location information, and the code patterns may correspond to predefined data codes. For example, the code patterns may correspond to particular areas of the display panel 100. The areas to which the code patterns correspond may have the same or difference sizes. The touch sensing unit TSU, the code pattern part, and the code patterns will be described later in detail.

The display driving unit 200 may output signals and voltages for driving the display unit DU. The display driving unit 200 may provide data voltages to data lines. The display driving unit 200 may provide power supply voltages to power lines and may provide gate control signals to a gate driving unit.

The touch driving unit 400 may be connected to the touch sensing unit TSU. The touch driving unit 400 may provide touch driving signals to the touch electrodes and may sense capacitance variations between the touch electrodes. The touch driving unit 400 may calculate the presence and the coordinates of touch input from the user based on the capacitance variations between the touch electrodes.

The main processor 500 may control all of the functions of the display device 10. For example, the main processor 500 may provide digital video data to the display driving unit 200 so that the display panel 100 may display an image. For example, the main processor 500 may receive touch data from the touch driving unit 400 to determine the coordinates of touch input from the user and may either generate digital video data corresponding to the touch coordinates of the touch input or execute an application pointed to by an icon at the touch coordinates of the touch input. In another example, the main processor 500 may receive coordinate data from the smart pen 20 to determine the touch coordinates of touch input from the smart pen 20 and may either generate digital video data corresponding to the touch coordinates of the touch input or execute an application pointed to by an icon at the touch coordinates of the touch input.

The communication unit 600 may communicate with an external device in a wired or wireless manner. For example, the communication unit 600 may transmit communication signals to, or receive communication signals from, the communication module 24 of the smart pen 20. The communication unit 600 may receive coordinate data consisting of data codes from the smart pen 20 and may provide the coordinate data to the main processor 500.

Referring to FIG. 2, the code detection unit 21 of the smart pen 20 is disposed near the nib part of the smart pen 20 and detects the code pattern part of the display panel 100 of the display device 10. In other words, the code detection unit 21 of the smart pen 20 is disposed near the end of the smart pen 20. For example, the code detection unit 21 may include a light emitter 21(*a*), which emits infrared (IR) light via at least one IR light source, and a light receiver 21(*b*), which detects, with the use of an IR camera, IR light reflected from the code patterns of the code pattern part of the display panel 100.

The light source of the light emitter 21(*a*) may be implemented as an array of IR light-emitting diodes (LEDs) that are arranged in a matrix. The IR camera of the light receiver 21(*b*) may include a filter capable of transmitting IR light therethrough while blocking other wavelength ranges, a lens system for focusing IR light transmitted through the filter, and an optical image sensor for converting an optical image formed by the lens system into an electric image signal. The optical image sensor may be implemented as an array of image sensors that are arranged in a matrix and may provide shape data of the code patterns of the code pattern part based on IR light reflected from the code patterns of the code pattern part. The code detection unit 21 of the smart pen 20 may continuously detect the code pattern part included in at least part of the touch sensing unit TSU to continuously generate shape data of the code patterns and may provide the shape data to the code processor 23.

The code processor 23 may continuously receive shape data of the code pattern part from the code detection unit 21. For example, the code processor 23 may continuously receive shape data of the code pattern part from the code detection unit 21 while the smart pen 20 is within a predetermined range of the display panel 100. For example, the code processor 23 may continuously receive shape data regarding the code patterns of the code pattern part and may identify the structure and shape of the code patterns. The code processor 23 may extract or generate data codes corresponding to the structure and shape of the code patterns, may combine the data codes, and may extract or generate coordinate data corresponding to the result of the combination. The code processor 23 may transmit the coordinate data to the display device 10 via the communication module 24. The code processor 23 can quickly generate coordinate data without needing a complicated computation and correction processes, by receiving the shape data of the code pattern part and generating data codes corresponding to the received shape data.

The communication module 24 may communicate with an external device in a wired or wireless manner. For example, the communication module 24 may transmit communication signals to, or receive communication signals from, the communication unit 600 of the display device 10. The communication module 24 may receive coordinate data consisting of data codes from the code processor 23 and may provide the coordinate data to the communication unit 600.

The memory 25 may store data necessary for driving the smart pen 20. Shape data for the code patterns and data codes corresponding to the shape data and the code patterns are stored in the memory 25. In addition, data codes and coordinate data for combinations of the data codes are stored in the memory 25. The memory 25 shares the data codes and the coordinate data with the code processor 23. Accordingly, the code processor 23 can combine data codes based on the data codes and the coordinate data stored in the memory 25 and can extract or generate coordinate data corresponding to the result of the combination.

Figure 3:
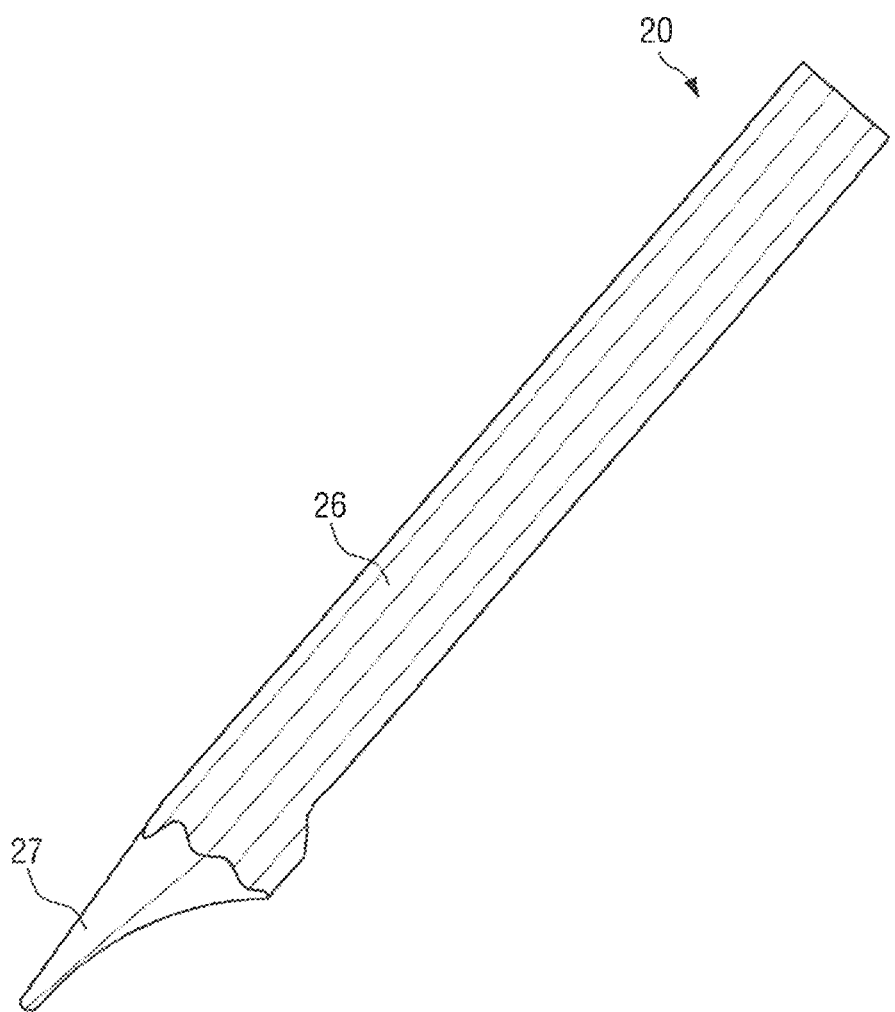
FIG. 3 is a side view of the smart pen of FIGS. 1 and 2.
Figure 4:
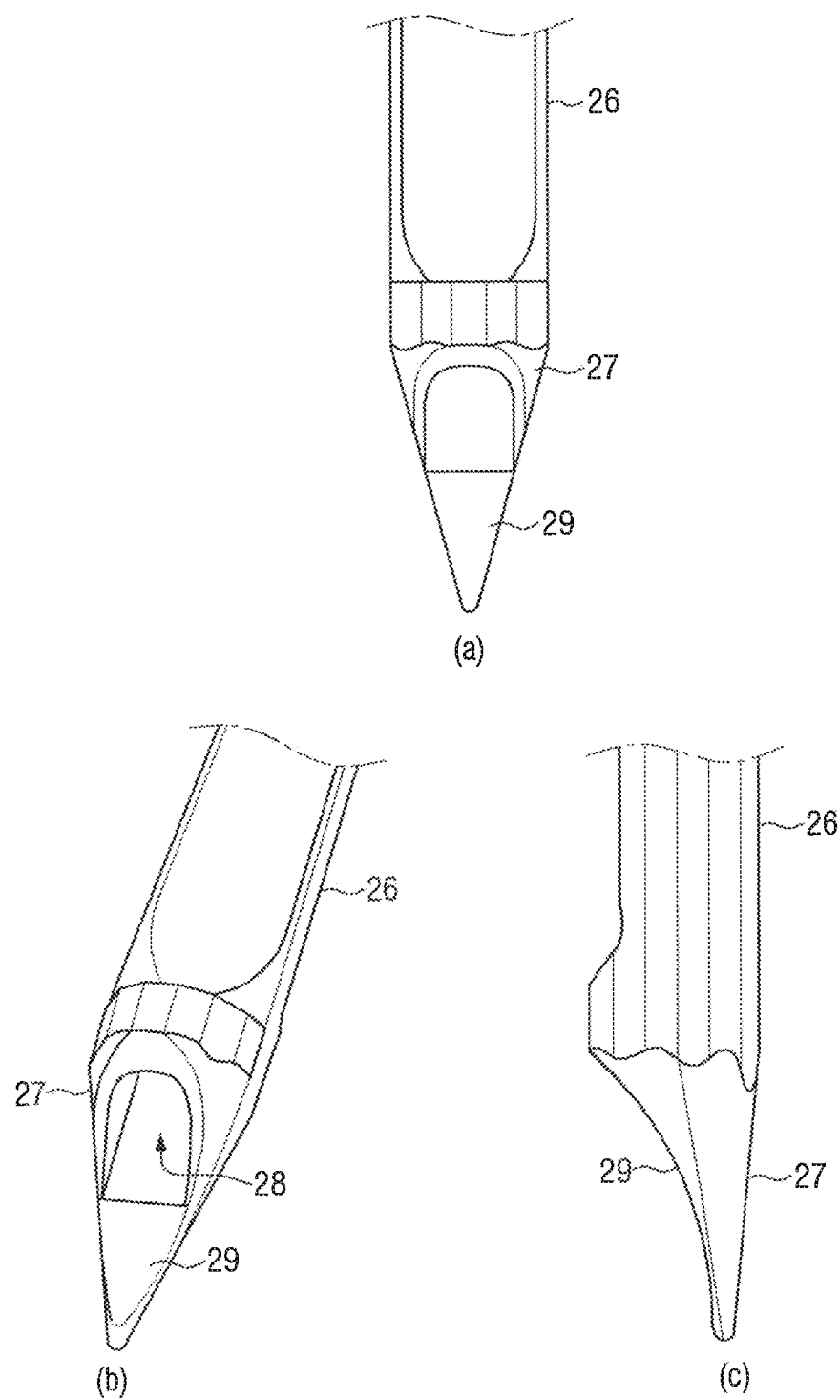
FIG. 4 illustrates a body part and a nib part of the smart pen of FIG. 3.

FIG. 3 is a side view of the smart pen of FIGS. 1 and 2. FIG. 4 illustrates a body part and a nib part of the smart pen of FIG. 3.

Referring to FIGS. 3 and 4, the smart pen 20 may include a body part 26 and a nib part 27, which is formed at one end of, and in one body with, the body part 26, and may be in the shape of a writing instrument such as an electronic pen. For example, the nib part 27 may be formed at a first end of the body part 26.

The body part 26 may be formed as a rod that extends lengthwise in one direction to provide a handle function and may form the outer shape of a writing instrument.

The nib part 27 may be formed at one end of the body part 26 and may form the path along which reflected light travels or is received, by reflecting light displayed by the display panel 100 or light reflected from the display panel 100 after the light is emitted from the code detection unit 21. For example, the nib part 27 may allow the light reflected from the display panel 100 after the light is emitted from the code detection unit 21 to be reflected again by a reflective surface 29 on the inside of the nib part 27, without being lost by a specular reflective surface or angle, and may thus be able to improve the light-receiving efficiency of the code detection unit 21.

To improve the light reflection efficiency of the nib part 27, the reflective surface 29 on the inside of the nib part 27 may be formed in the shape of an inverted triangle or another polygon. Alternatively, the reflective surface 29 on the inside of the nib part 27 may be formed in a circular or elliptical shape. FIGS. 4(a) through 4(c) illustrate the reflective surface 29 on the inside of the nib part 27 as having the shape of an inverted triangle. For example, the nib part 27 may be formed in the shape of the nib of a fountain pen, at one end of the body part 26.

At least one light-transmitting hole 28, which forms paths for outputting IR light from the code detection unit 21 and receiving light reflected from the reflective surface 29 of the nib part 27, may be provided in the form of a through hole at the inner center of the nib part 27. In other words, the nib part 27 may include an opening for outputting IR light from the code detection unit 21 and receiving light reflected from the reflective surface 29.

The code detection unit 21 may be embedded in the body part 26 to receive IR light reflected from the display panel 100 and the reflective surface 29 of the nib part 27. In addition, the code detection unit 21 detects shape data for the code patterns of the display panel 100. To accomplish this, the code detection unit 21 may emit IR light to the light-transmitting hole 28 of the nib part 27 through the light emitter 21(a) in the body part 26. In a case where IR light is emitted from the light emitter 21(a) of the code detection unit 21, the IR light from the light emitter 21(a) may be emitted toward the end of the nib part 27 through the light-transmitting hole 28. Thus, not only light from the display panel 100, but also reflected light from the display panel 100 and the reflective surface 29 of the nib part 27 may be incident upon the light receiver 21(b) of the code detection unit 21 through the light-transmitting hole 27. Accordingly, the code detection unit 21 may detect the shape data for the code patterns of the display panel 100 based on the IR light received by the light receiver 21(b).

Figure 5:
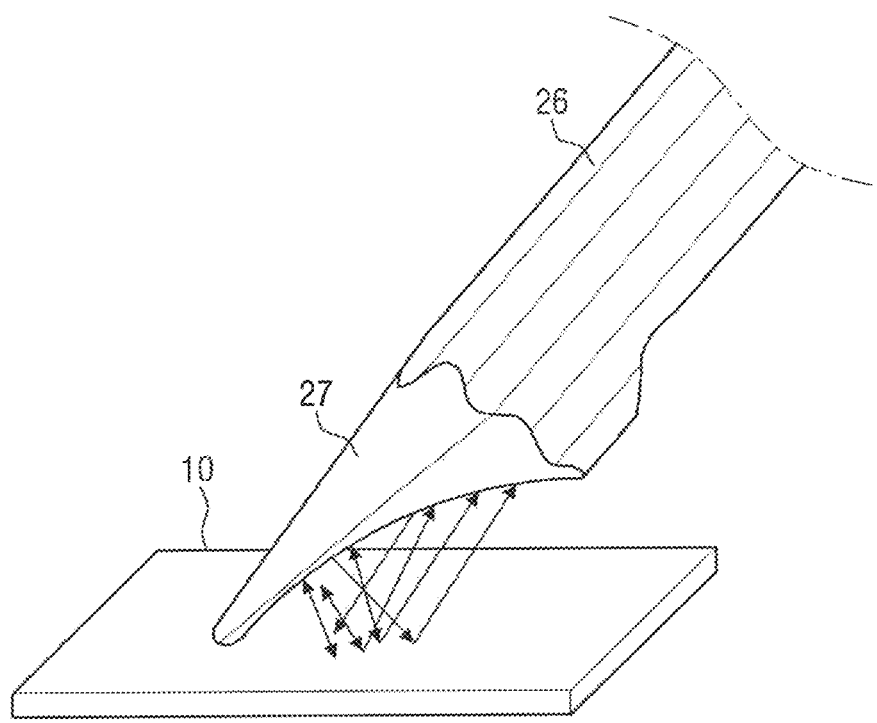
FIG. 5 is a perspective view illustrating how the nib part of FIG. 4 reflects light.

FIG. 5 is a perspective view illustrating how the nib part of FIG. 4 reflects light.

Referring to FIG. 5, light emitted from the light emitter 21(a) of the code detection unit 21 may be emitted toward the end of the nib part 27 through the light-transmitting hole 28 of the nib part 27 and may then be reflected by the display panel 100. In a case where light is output to, or received from, the display panel 100 by tilting the smart pen 20 at a predetermined angle, the light may be diffusely reflected or lost due to the difference in direction between the incidence angle and the reflection angle of the light with the display panel 100. However, as the reflective surface 29 of the nib part 27 covers one side of the display panel 100, light reflected from the display panel 100 and from the reflective surface 29 of the nib part 27 may not be lost, but may be received by the light receiver 21(b) of the code detection unit 21 through the light-transmitting hole 28 of the nib part 27.

To improve the reflection efficiency of the nib part 27 and the reflective surface 29, the reflective surface 29 of the nib part 27 may be formed as an IR reflector including barium sulfate or magnesium oxide or may be coated with an IR reflector.

Figure 6:
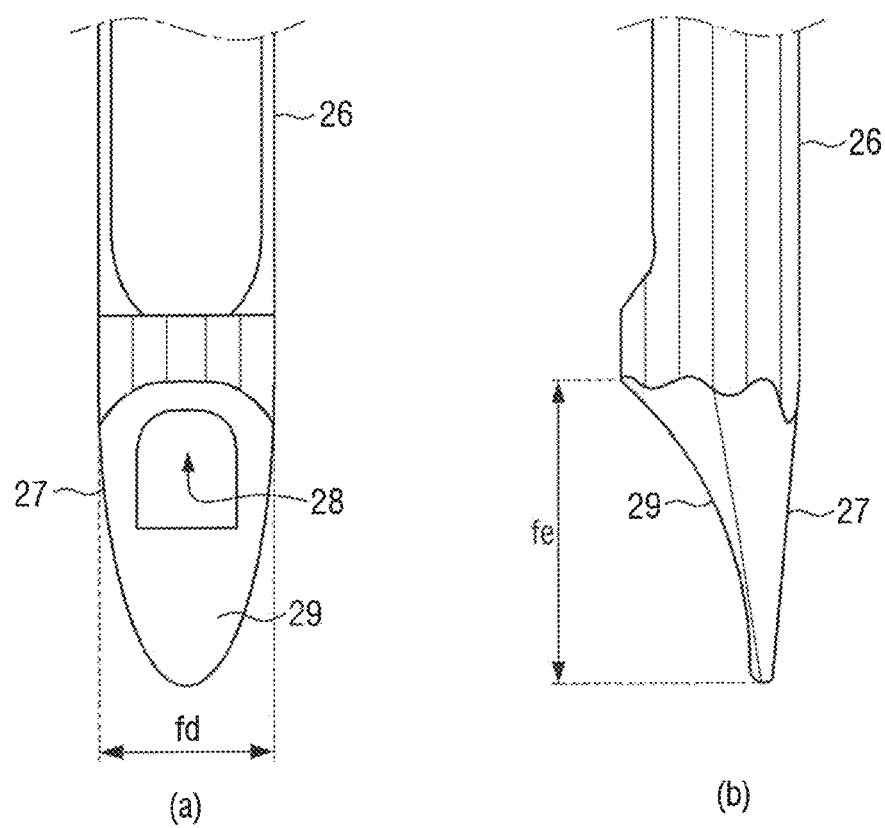
FIG. 6 illustrates the structure of a nib part of a smart pen according to another embodiment of the present disclosure.

FIG. 6 illustrates the structure of a nib part of a smart pen according to another embodiment of the present disclosure.

Referring to FIG. 6, a reflective width fd and a length fe of the reflective surface 29 on the inside of the nib part 27 may be determined to improve the light reflection efficiency of the nib part 27. For example, the reflective width fd of the reflective surface 29, which is formed at the nib part 27, may be the same as or greater than the thickness or width of the body part 27 to increase the amount of light reflected by the reflective surface 29. Since the reflective surface 29 has a wider reflective area, the reflective surface 29 can reflect more light diffusely reflected from the display panel 100, and as a result, the amount of light received by the light receiving unit 21(b) of the code detecting unit 21 may increase. Accordingly, the amount of light reflected from the reflective surface 29 and the amount of light received by the light receiver 21(b) can be further increased by forming the reflective width fd of the reflective surface 29 at the nib part 27 to be equal to or greater than the thickness or width of the body part 26.

Figure 7:
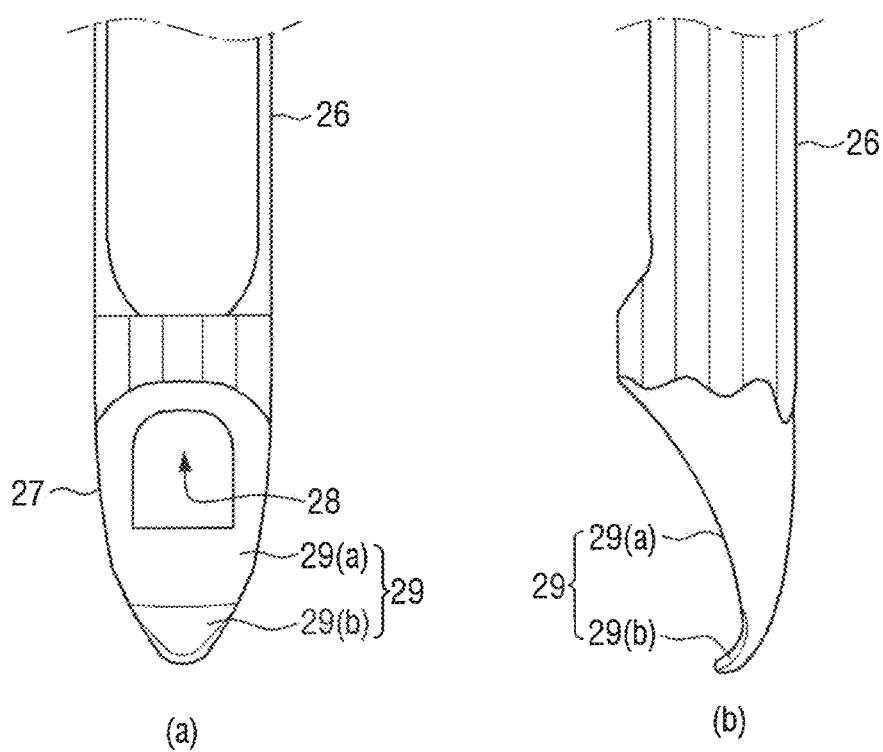
FIG. 7 illustrates the structures of a nib part and a reflective surface of a smart pen according to another embodiment of the present disclosure.

FIG. 7 illustrates the structures of a nib part and a reflective surface of a smart pen according to another embodiment of the present disclosure.

Referring to FIG. 7, a reflective surface 29 on the inside of a nib part 27 may include a first reflective surface 29(a), which has a concave shape with a first curvature, and a second reflective surface 29(b), which has a concave shape with a second curvature greater than the first curvature.

To improve the light reflection efficiency of the nib part 27, the first reflective surface 29(a) may be formed in a concave shape having the first curvature. Since the first reflective surface 29(a) is formed to have a concave first curvature, the efficiency of collecting IR light reflected from the first reflective surface 29(a) can be improved. In addition, the second reflective surface 29(b) may be formed to have the second curvature, which is greater than the curvature of the first reflective surface 29(a), e.g., the first curvature. Since the second reflective surface 29(b) is formed to have a greater curvature than the first reflective surface 29(a), the efficiency of collecting IR light reflected from the second reflective surface 29(b) can be further improved than the efficiency of collecting IR light reflected from the first reflective surface 29(a).

The greater the reflective width and the length of the first reflective surface 29(a), the greater the amount of light reflected by the first reflective surface 29(a). Thus, the reflective width of the first reflective surface 29(a) may be formed to be the same as or greater than the thickness or width of the body part 26 to increase the amount of light reflected by the first reflective surface 29(a). Since the first reflective surface 29(a) has a wider reflective area, the first reflective surface 29(a) can reflect more light diffusely reflected from the display panel 100. Accordingly, the amount of light reflected from the reflective surface 29(a) and the amount of light received by a light receiver 21(b) can be further increased by forming as large a first reflective surface 29(a) as possible.

According to an embodiment of the present disclosure, the smart pen 20 includes: the body part 26; the nib part 27 at an end of the body part 26; the code detection unit 21 for receiving light reflected from the display panel 100 and the nib part 27, wherein the light reflected from the display panel 100 and the nib part 27 is used to detect shape data for code patterns of the display panel 100; and the code processor 23 for generating coordinate data based on the shape data and transmitting the coordinate data to the main processor 500 for driving the display panel 100 based on the coordinate data.

Figure 8:
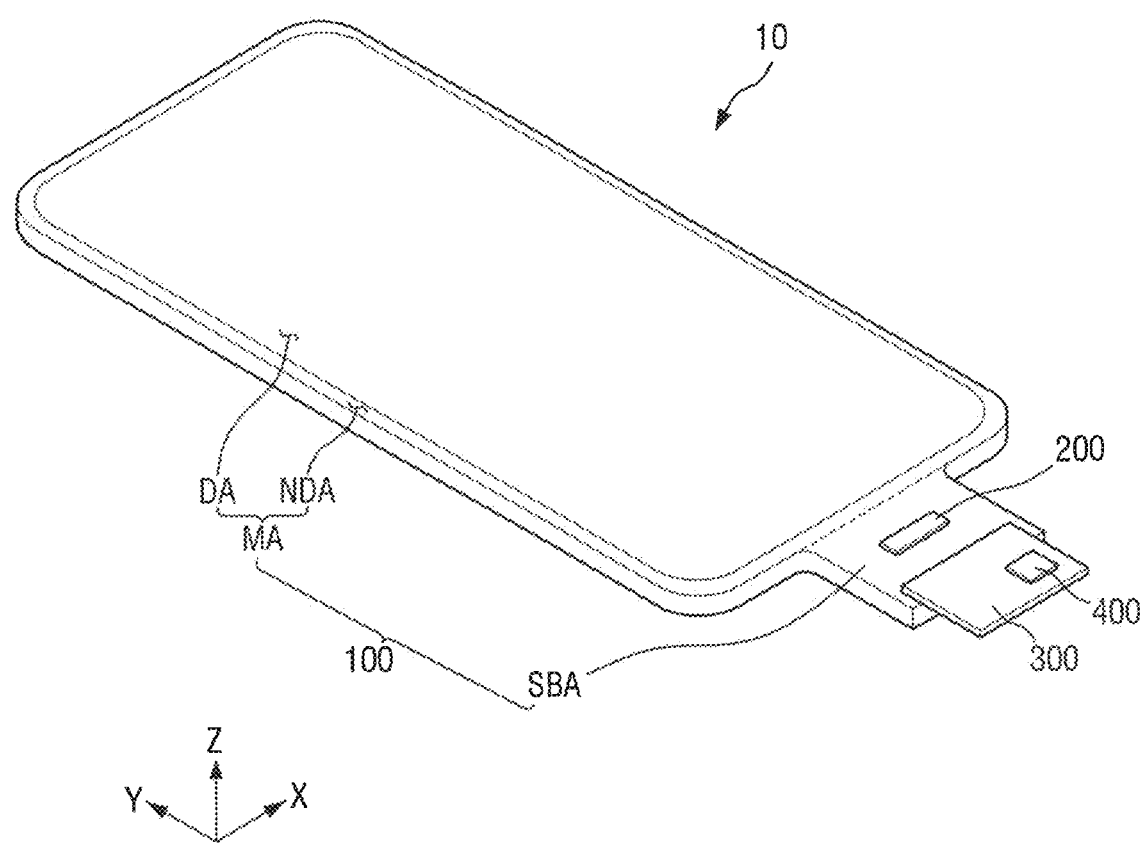
FIG. 8 is a perspective view of the display device of FIG. 1.

FIG. 8 is a perspective view of the display device of FIG. 1.

Referring to FIG. 8, the display device 10 may be applicable to a portable electronic device such as a mobile phone, a smartphone, a tablet personal computer (PC), a mobile communication terminal, an electronic notepad, an electronic book (e-book), a portable multimedia player (PMP), a navigation device, or an ultra-mobile PC (UMPC). For example, the display device 10 may be used as the display unit of a television (TV), a laptop computer, a monitor, a billboard, or an Internet-of-Things (IoT) device. In another example, the display device 10 may be applicable to a wearable device such as a smartwatch, a watchphone, a glasses display, or a head-mounted display (HMD). In yet another example, the display device 10 may be applicable to the dashboard, the center fascia, or the center information display (CID) of a vehicle, the room mirror display of a vehicle that can replace side-view mirrors, or an entertainment display disposed at the rear of the front seat of a vehicle.

The display device 10 may have an almost rectangular shape in a plan view. For example, the display device 10 may have an almost rectangular shape with short sides in an X-axis direction and long sides in a Y-axis direction in a plan view. The corners at which the short sides and the long sides of the display device 10 meet may be rounded or right-angled. The planar shape of the display device 10 is not limited to a rectangular shape, and the display device 10 may be formed in various other shapes, such as another polygonal shape, a circular shape, or an elliptical shape.

The display device 10 may include a display panel 100, a display driving unit 200, a circuit board 300, and a touch driving unit 400.

The display panel 100 may include a main area MA and a subarea SBA.

The main area MA may include a display area DA in which pixels for displaying an image are provided and a non-display area NDA which is disposed around the display area DA. The non-display area NDA may be referred to as a peripheral area or a bezel area. The display area DA may emit light through a plurality of emission areas or a plurality of opening areas. For example, the display panel 100 may include pixel circuits including switching elements, a pixel defining layer defining emission areas or opening areas, and self-light-emitting elements.

The non-display area NDA may be an area outside the display area DA. The non-display area NDA may be an edge area of the main area MA of the display area 100. The non-display area NDA may include the gate driving unit providing gate signals to scan lines and fan-out lines connecting the display driving unit 200 and the display area DA.

The subarea SBA may extend from one side of the main area MA. The subarea SBA may include a flexible material that is bendable, foldable, or rollable. For example, as the subarea SBA is bent, the subarea SBA may overlap with the main area MA in a Z-axis direction. In other words, the subarea SBA may be disposed below the main area MA. The subarea SBA may include the display driving unit 200 and a pad unit, which is connected to the circuit board 300. Optionally, the subarea SBA may not be provided, and the display driving unit 200 and the pad unit may be disposed in the non-display area NDA.

The display driving unit 200 may output signals and voltages for driving the display panel 100. The display driving unit 200 may provide data voltages to data lines. The display driving unit 200 may provide power supply voltages to power supply lines and may provide scan control signals to the gate driving unit. The display driving unit 200 may be formed as an integrated circuit (IC) and may be mounted on the display panel 100 in a chip-on-glass (COG) or chip-on-plastic (COP) manner or via ultrasonic bonding. For example, the display driving unit 200 may be disposed in the subarea SBA, and as the subarea SBA is bent, the display driving unit 200 may overlap with the main area MA in the Z-axis direction. In other words, the display driving unit 200 may be disposed below the main area MA. In another example, the display driving unit 200 may be mounted on the circuit board 300.

The circuit board 300 may be attached on the pad unit of the display panel 100 via an anisotropic conductive film (ACF). The lead lines of the circuit board 300 may be electrically connected to the pad unit of the display panel 100. The circuit board 300 may be a flexible printed circuit board (FPCB), a printed circuit board (PCB), or a flexible film such as a chip-on-film (COF).

The touch driving unit 400 may be mounted on the circuit board 300. The touch driving unit 400 may be connected to the touch sensing unit of the display panel 100. The touch driving unit 400 may provide touch driving signals to a plurality of touch electrodes and may detect variations in the capacitances of the touch electrodes. For example, the touch driving signals may be pulse signals having a predetermined frequency. The touch driving unit 400 may detect the presence of touch input and calculate the touch coordinates of the touch input based on the variations in the capacitances of the touch electrodes. The touch driving unit 400 may be formed as an IC.

Figure 9:
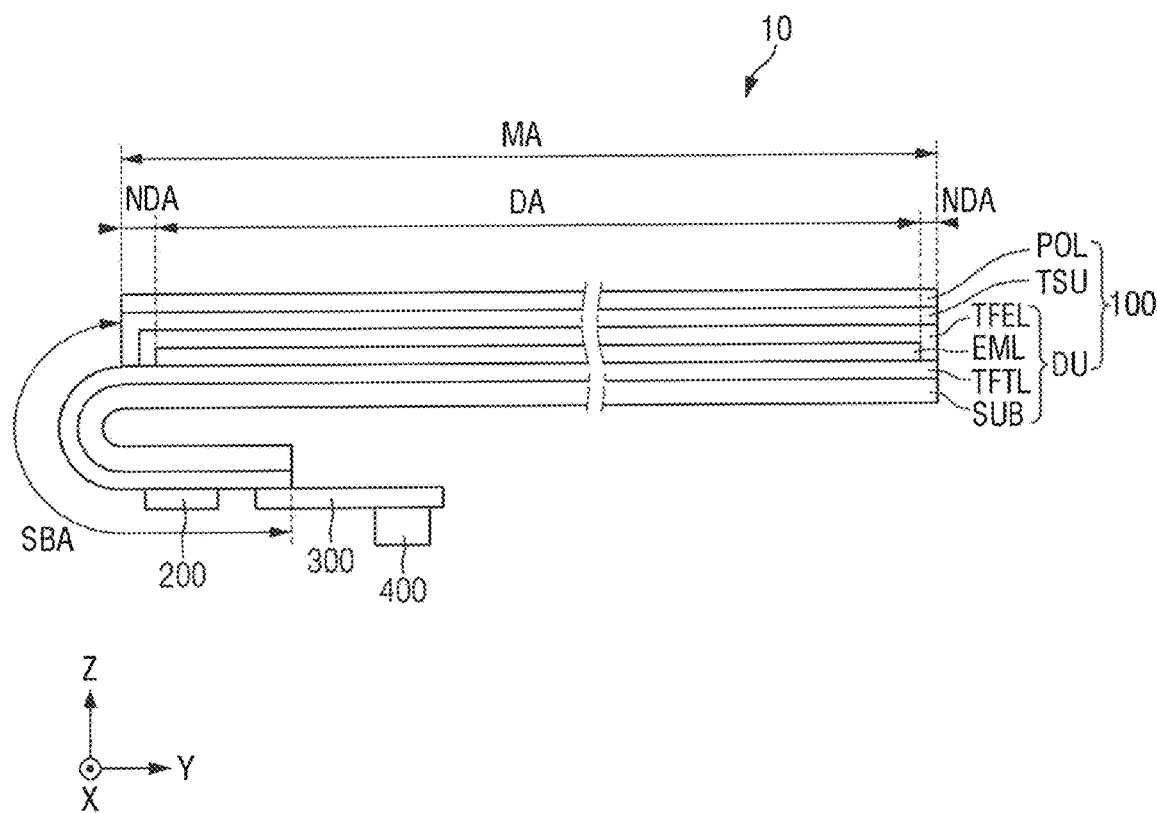
FIG. 9 is a cross-sectional view of the display device of FIG. 1.

FIG. 9 is a cross-sectional view of the display device of FIG. 1.

Referring to FIG. 9, the display panel 100 may include a display unit DU, a touch sensing unit TSU, and a polarizing layer POL. The display unit DU may include a substrate SUB, a thin-film transistor (TFT) layer TFTL, a light-emitting element layer EML, and an encapsulation layer TFEL.

The substrate SUB may be a base substrate or a base member. The substrate SUB may be a flexible substrate that is bendable, foldable, or rollable. For example, the substrate SUB may include a glass material or a metallic material, but the present disclosure is not limited thereto. In another example, the substrate SUB may include a polymer resin such as polyimide (PI).

The TFT layer TFTL may be disposed on the substrate SUB. For example, the TFT layer may be formed on the entirety of the substrate SUB. The TFT layer TFTL may include a plurality of TFTs that form the pixel circuits of pixels. The TFT layer TFTL may include gate lines, data lines, power supply lines, gate control lines, and fan-out lines, which connect the display driving unit 200 and the data lines, and lead lines, which connect the display driving unit 200 and the pad unit. Each of the TFTs may include a semiconductor region, a source electrode, a drain electrode, and a gate electrode. For example, in a case where the gate driving unit is formed on one side of the non-display area NDA of the display panel 100, the gate driving unit may include the TFTs.

The TFT layer TFTL may be disposed in the display area DA, the non-display area NDA, and the subarea SBA. The TFTs, the gate lines, the data lines, and the power supply lines of the TFT layer TFTL may be disposed in the display area DA. The gate control lines and the fan-out lines of the TFT layer TFTL may be disposed in the non-display area NDA. The lead lines of the TFT layer TFTL may be disposed in the subarea SBA.

The light-emitting element layer EML may be disposed on the TFT layer TFTL. The light-emitting element layer EML may include a plurality of light-emitting elements, in which first electrodes, emission layers, and second electrodes are sequentially stacked to emit light, and a pixel-defining layer, which defines pixels. The light-emitting elements of the light-emitting element layer EML may be disposed in the display area DA. The light-emitting elements of the light-emitting layer EML may not be disposed in the display area DA.

For example, the emission layers may be organic emission layers including an organic material. The light-emitting layers may include hole transport layers, organic light-emitting layers, and electron transport layers. Since the first electrodes receive a predetermined voltage via the TFTs of the TFT layer TFTL and the second electrodes receive a cathode electrode, holes and electrons may move to the emission layers through the hole transport layer and the electron transport layers and may be combined together in the emission layers to emit light. For example, the first electrodes may be anode electrodes, and the second electrodes may be cathode electrodes. However, the present disclosure is not limited to this example.

In another example, the light-emitting elements of the light-emitting element layer EML may include QLEDs including quantum-dot light-emitting layers or ILEDs including an inorganic semiconductor.

The encapsulation layer TFEL may cover the top surface and the side surfaces of the light-emitting element layer EML and may protect the light-emitting element layer EML. The encapsulation layer TFEL may be in contact with the TFT layer TFTL at sides of the light-emitting element layer EML. The encapsulation layer TFEL may include at least one inorganic layer and at least one organic layer for encapsulating the light-emitting element layer EML.

The touch sensing unit TSU may be disposed on the encapsulation layer TFEL. The touch sensing unit TSU may include a plurality of touch electrodes for detecting touch input from a user in a capacitive manner and touch lines for connecting the touch electrodes and the touch driving unit 400. For example, the touch sensing unit TSU may detect touch input from the user in a self-capacitive manner or a mutual capacitance manner.

Alternatively, the touch sensing unit TSU may be disposed on a separate substrate disposed on the display unit DU. In this case, the substrate that supports the touch sensing unit TSU may be a base member that encapsulates the display unit DU.

The touch electrodes of the touch sensing unit TSU may be disposed in a touch sensor area that overlaps with the display area DA. The touch lines of the touch sensing unit TSU may be disposed in a touch peripheral area that overlaps with the non-display area NDA.

The polarizing layer POL may be disposed on the touch sensing unit TSU. The polarizing layer POL may be attached on the touch sensing unit TSU via an optically clear adhesive (OCA) layer or an optically clear resin (OCR). For example, the polarizing layer POL may include a linear polarizing plate and a phase retardation layer such as a quarter-wave ($\lambda/4$) plate, and the linear polarizing plate and the phase retardation layer may be sequentially stacked on the touch sensing unit TSU.

The subarea SBA may extend from one side of the main area MA. The subarea SBA may include a flexible material that is bendable, foldable, or rollable. For example, as the subarea SBA is bent, the subarea SBA may overlap with the main area MA in the Z-axis direction. The subarea SBA may include the display driving unit 200 and the pad unit, which is connected to the circuit board 300.

Figure 10:
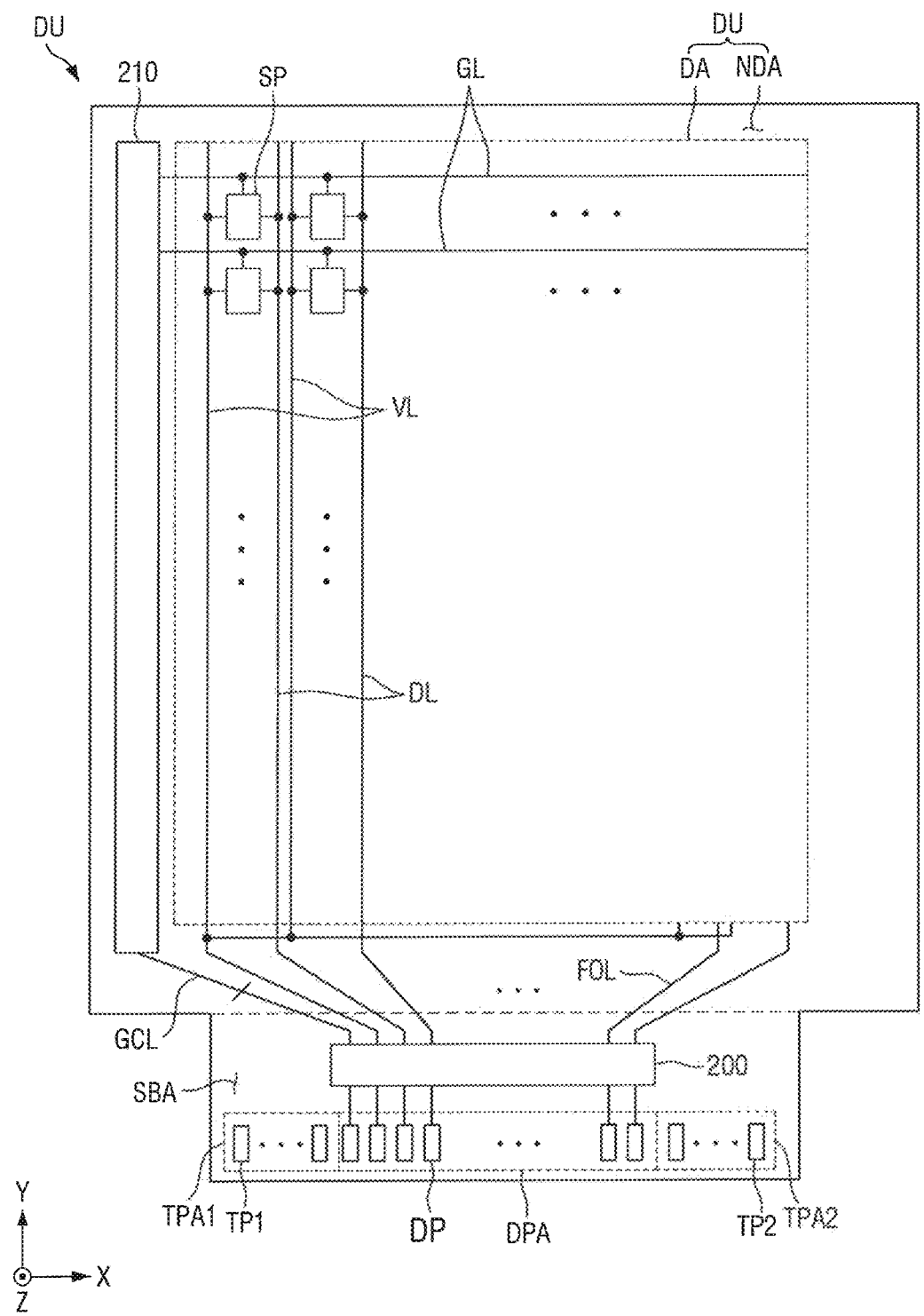
FIG. 10 is a plan view of a display unit of a display device according to an embodiment of the present disclosure.

FIG. 10 is a plan view of the display unit of the display device of FIG. 1.

Referring to FIG. 10, the display unit DU may include a display area DA and a non-display area NDA.

The display area DA, which is an area that displays an image, may be a central part of the display panel 100. The display area DA may include a plurality of pixels SP, a plurality of gate lines GL, a plurality of data lines DL, and a plurality of power supply lines VL. The pixels SP may be minimal units for outputting light. In other words, a single pixel SP may be a minimal unit for outputting light.

The gate lines GL may provide gate signals from a gate driving unit 210 to the pixels SP. The gate lines GL may extend in the X-axis direction and may be spaced apart from one another in the Y-axis direction, which intersects the X-axis direction.

The data lines DL may provide data voltages from the display driving unit 200 to the pixels SP. The data lines DL may extend in the Y-axis direction and may be spaced apart from one another in the X-axis direction. The data lines DL may intersect the gate lines GL.

The power supply lines VL may provide power supply voltages from the display driving unit 200 to the pixels SP. Here, the power supply voltages may include at least one of a driving voltage, an initialization voltage, and a reference voltage. The power supply lines VL may extend in the Y-axis direction and may be spaced apart from one another in the X-axis direction. The power supply lines VL may intersect the gate lines GL and be adjacent to the data lines DL.

The non-display area NDA may surround the display area DA. The non-display area NDA may include the gate driving unit 210, fan-out lines FOL, and gate control lines GCL. The gate driving unit 210 may generate a plurality of gate signals based on gate control signals and may sequentially provide the gate signals to the gate lines GL in a predefined order.

The fan-out lines FOL may extend from the display driving unit 200 to the display area DA. The fan-out lines FOL may provide data voltages from the display driving unit 200 to the data lines DL.

The gate control lines GCL may extend from the display driving unit 200 to the gate driving unit 210. The gate control lines GCL may provide the gate control signals from the display driving unit 200 to the gate driving unit 210.

The subarea SBA may include the display driving unit 200, a display pad area DPA, and first and second touch pad areas TPA1 and TPA2. The display pad area DPA may be located between the first and second touch pad areas TPA1 and TPA2.

The display driving unit 200 may output signals and voltages for driving the display panel 100 to the fan-out lines FOL. The display driving unit 200 may provide data voltages to the data lines DL through the fan-out lines FOL. The data voltages may be provided to the pixels SP and may determine the luminance of the pixels SP. The display driving unit 200 may provide the gate control signals to the gate driving unit 210 through the gate control lines GCL.

The display pad area DPA, the first touch pad area TPA1, and the second touch pad area TPA2 may be disposed along an edge of the subarea SBA. The display pad area DPA, the first touch pad area TPA1, and the second touch pad area TPA2 may be electrically connected to the circuit board 300 via a low-resistance, high-reliability member such as an anisotropic conductive layer or a self-assembly anisotropic conductive paste (SAP).

The display pad area DPA may include a plurality of display pads DP. The display pads DP may be connected to a main processor through the circuit board 300. The display pads DP may be connected to the circuit board 300 to receive digital video data and to provide digital video data to the display driving unit 200. The first touch pad area TPA1 may include first touch pad units TP1 and the second touch pad area TPA2 may include second touch pad units TP2.

Figure 11:
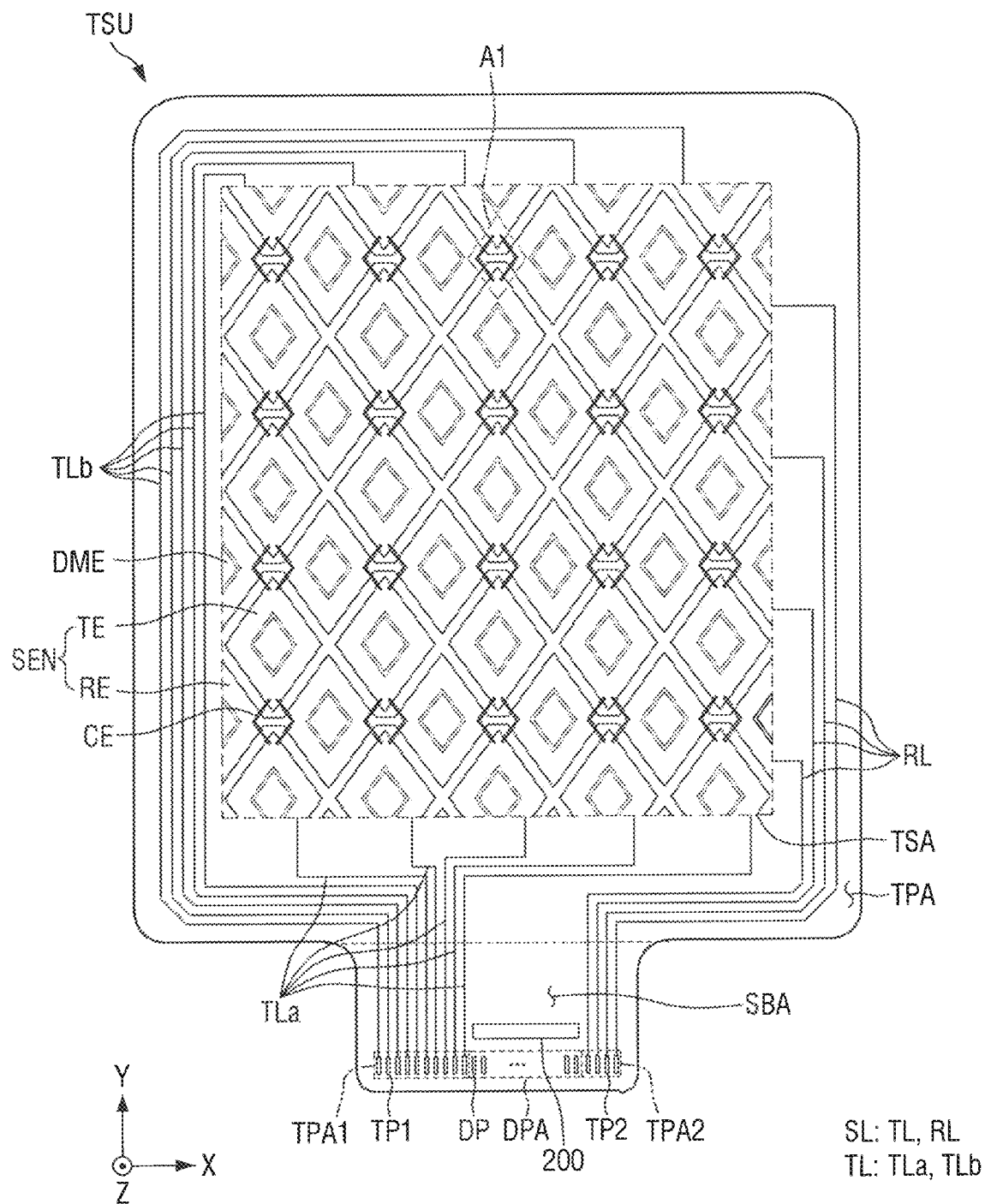
FIG. 11 is a plan view of a touch sensing unit of a display device according to an embodiment of the present disclosure.

FIG. 11 is a plan view of the touch sensing unit of the display device of FIG. 1.

Referring to FIG. 11, the touch sensing unit TSU may include a touch sensor area TSA, which detects touch input from the user, and a touch peripheral area TPA, which is disposed around the touch sensor area TSA. The touch sensor area TSA may overlap with the display area DA of the display unit DU, and the touch peripheral area TPA may overlap with the non-display area NDA of the display unit DU.

The touch sensor area TSA may include a plurality of touch electrodes SEN and a plurality of dummy electrodes DME. The touch electrodes SEN may form mutual capacitances or self-capacitances to detect touch input from an object or a person. The touch electrodes SEN may include a plurality of driving electrodes TE and a plurality of sensing electrodes RE.

The driving electrodes TE may be arranged in the X- and Y-axis directions. The driving electrodes TE may be spaced apart from one another in the X- and Y-axis directions. Each pair of adjacent driving electrodes TE in the Y-axis direction may be electrically connected via bridge electrodes CE.

The driving electrodes TE may be connected to the first touch pad units TP1 via driving lines TL. The driving lines TL may include lower driving lines TLa and upper driving lines TLb. For example, driving electrodes TE in the lower part of the touch sensor area TSA may be connected to the first touch pad units TP1 via the lower driving lines TLa, and driving electrodes TE in the upper part of the touch sensor area TSA may be connected to the first touch pad units TP1 via the upper driving lines TLb. The lower driving lines TLa may extend to the first touch pad units TP1 through the lower part of the touch peripheral area TPA. The upper driving lines TLb may extend to the first touch pad units TP1 through the upper, left, and lower parts of the touch peripheral area TPA. The first touch pad units TP1 may be connected to the touch driving unit 400 via the circuit board 300.

The bridge electrodes CE may be bent at least once. For example, the bridge electrodes CE may be in the shape of angle brackets (e.g., "<" and ">"), but the shape of the bridge electrodes CE, is not particularly limited. Each pair of adjacent driving electrodes TE in the Y-axis direction may be connected by multiple bridge electrodes CE, and thus, even if one of the bridge electrodes CE is disconnected, the driving electrodes TE can be stably connected via the other non-disconnected bridge electrodes CE. Each pair of adjacent driving electrodes TE may be connected by two bridge electrodes CE, but the number of bridge electrodes CE is not particularly limited.

The bridge electrodes CE may be disposed in a different layer from the driving electrodes TE and the sensing electrodes RE. Each pair of adjacent sensing electrodes RE in the X-axis direction may be electrically connected via connectors disposed in the same layer as the driving electrodes TE or the sensing electrodes RE, and each pair of adjacent driving electrodes TE in the Y-axis direction may be electrically connected via bridge electrodes CE disposed in a different layer from the driving electrodes TE or the sensing electrodes RE. Thus, even if the bridge electrodes CE overlap with the sensing electrodes RE in the Z-axis direction, the driving electrodes TE can be insulated from the sensing electrodes RE. Mutual capacitances may be formed between the driving electrodes TE and the sensing electrodes RE.

The sensing electrodes RE may extend in the X-axis direction and may be spaced apart from one another in the Y-axis direction. The sensing electrodes RE may be arranged in the X- and Y-axis directions, and each pair of adjacent sensing electrodes RE in the X-axis direction may be electrically connected by a connector.

The sensing electrodes RE may be connected to the second touch pad units TP2 via sensing lines RL. For example, sensing electrodes RE disposed on a right part of the touch sensor area TSA may be connected to the second touch pad part TP2 via the sensing lines RL. The sensing lines RL may extend to the second touch pad units TP2 through the right and lower parts of the touch peripheral area TPA. The second touch pad units TP2 may be connected to the touch driving unit 400 via the circuit board 300.

Each of the dummy electrodes DME may be surrounded by the driving electrodes TE or the sensing electrodes RE. Each of the dummy electrodes DME may be spaced apart from, and insulated by, the driving electrodes TE or the sensing electrodes RE. Thus, the dummy electrodes DME may be electrically floated.

A display pad area DPA, a first touch pad area TPA1, and a second touch pad area TPA2 may be disposed on one edge of the subarea SBA. The display pad area DPA, the first touch pad area TPA1, and the second touch pad area TPA2 may be electrically connected to the circuit board 300 via a low-resistance, high-reliability material such as an ACF or a self-assembly anisotropic conductive paste (SAP).

The first touch pad area TPA1 may be disposed on one side of the display pad area DPA and may include a plurality of first touch pad units TP1. For example, the first touch pad area TPA1 may be disposed on a first side of the display pad area DPA. The first touch pad units TP1 may be electrically connected to the touch driving unit 400, which is disposed on the circuit board 300. The first touch pad units TP1 may provide touch driving signals to the driving electrodes TE via the driving lines TL.

The second touch pad area TPA2 may be disposed on the other side of the display pad area DPA and may include a plurality of second touch pad units TP2. For example, the second touch pad area TPA2 may be disposed on a second side of the display pad area DPA opposite the first side. The second touch pad units TP2 may be electrically connected to the touch driving unit 400, which is disposed on the circuit board 300. The second touch pad units TP2 may receive touch sensing signals via the sensing lines RL, which are connected to the second touch pad units TP2, and may detect variations in the mutual capacitances between the driving electrodes TE and the sensing electrodes RE.

Alternatively, the touch driving unit 400 may provide touch driving signals to the driving electrodes TE and the sensing electrodes RE and may receive touch sensing signals from the driving electrodes TE and the sensing electrodes RE. The touch driving unit 400 may detect charge variations in the driving electrodes TE and the sensing electrodes RE based on touch sensing signals.

Figure 12:
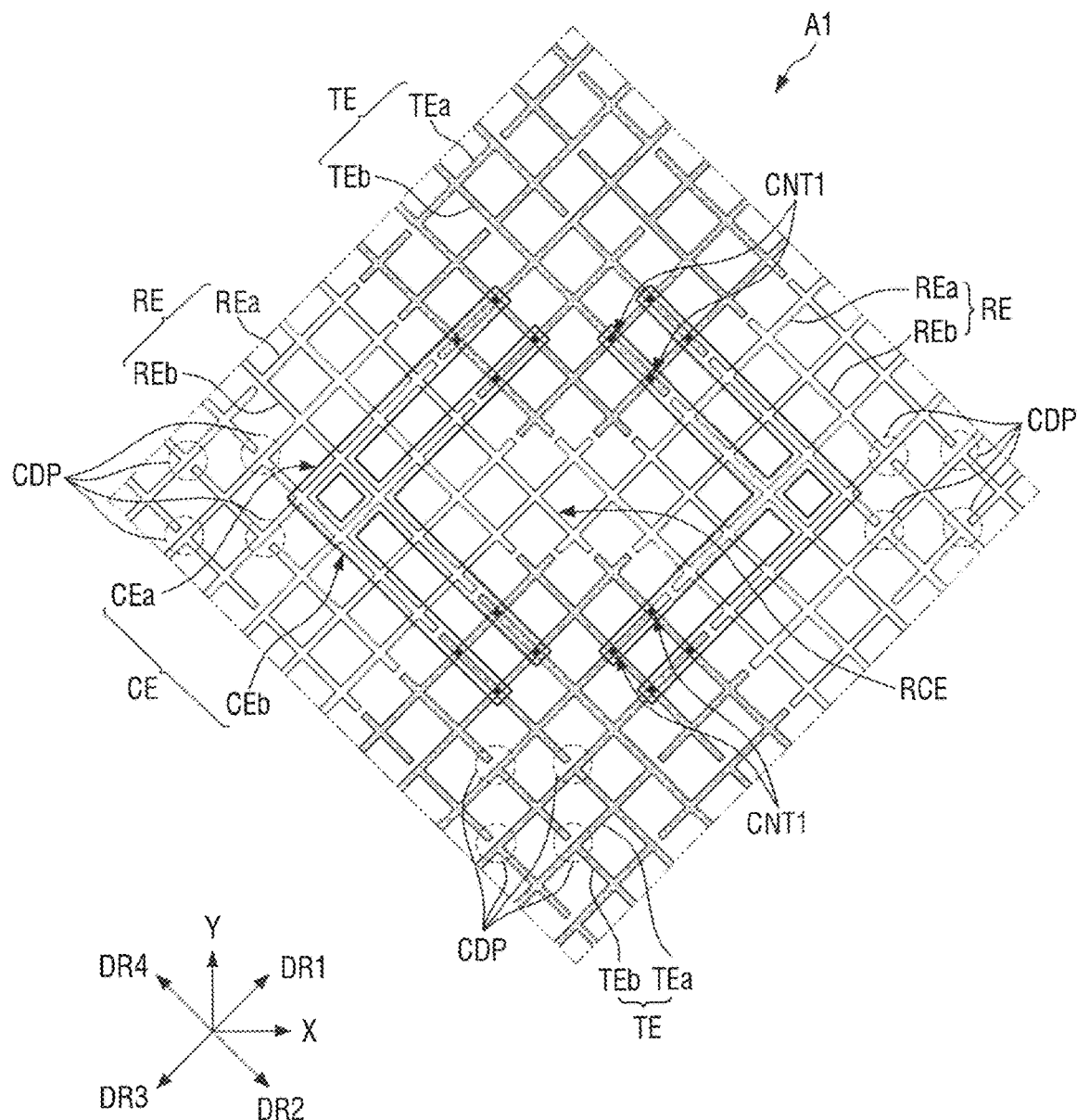
FIG. 12 is a plan view of an area A1 of FIG. 11.
Figure 13:
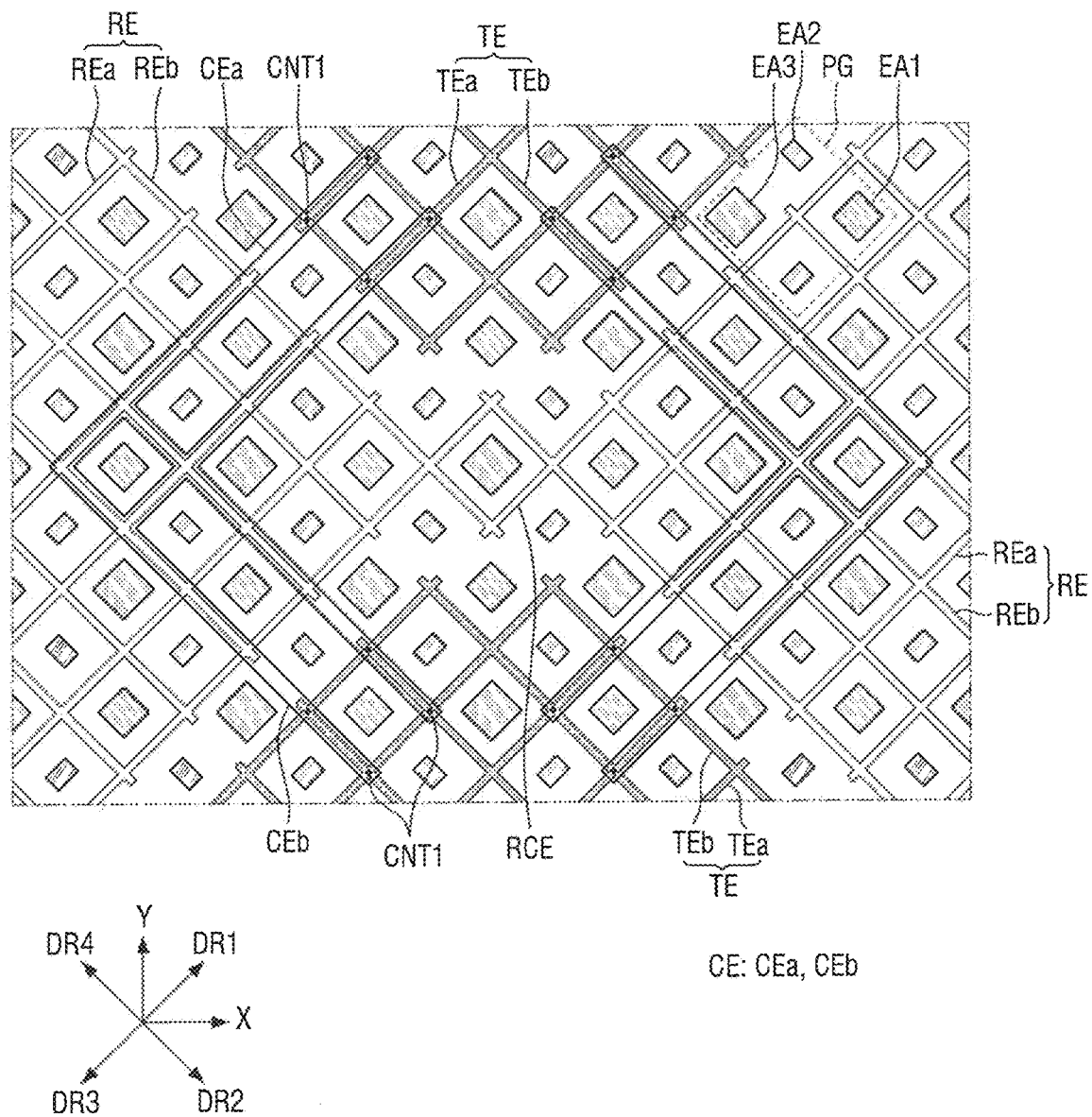
FIG. 13 is an enlarged plan view of part of the area A1 of FIG. 12.

FIG. 12 is a plan view of an area A1 of FIG. 11. FIG. 13 is an enlarged plan view of part of the area A1 of FIG. 12.

Referring to FIGS. 12 and 13, the driving electrodes TE, the sensing electrodes RE, and the dummy electrodes DME may be disposed in the same layer and may be spaced apart from one another.

The driving electrodes TE may be arranged in the X- and Y-axis directions. The driving electrodes TE may be spaced apart from one another in the X- and Y-axis directions. Each pair of adjacent driving electrodes TE in the Y-axis direction may be electrically connected by bridge electrodes CE.

The sensing electrodes RE may extend in the X-axis direction and may be spaced apart from one another in the Y-axis direction. The sensing electrodes RE may be arranged in the X- and Y-axis directions, and each pair of adjacent sensing electrodes RE in the X-axis direction may be electrically connected by a connector RCE. For example, the connector RCE may be disposed within the shortest distance of a corresponding pair of adjacent driving electrodes TE.

A plurality of bridge electrodes CE may be disposed in a different layer from the driving electrodes TE and the sensing electrodes RE. Each of the bridge electrodes CE may include first and second portions CEa and CEb. For example, the first portion CEa of each of the bridge electrodes CE may be connected to a driving electrode TE via first contact holes CNT1 to extend in a third direction DR3. The second portion CEb of each of the bridge electrodes CE may be bent from the second portion CEb of a corresponding bridge electrode CE to extend in a second direction DR2, in an area that overlaps with a sensing electrode SE, and may be connected to a driving electrode TE via first contact holes CNT1. A first direction DR1 may be a direction between the X- and Y-axis directions, the second direction DR2 may be a direction between the X-axis direction and the opposite direction of the Y-axis direction, and the third direction DR3 may be the opposite direction of the first direction DR1, and a fourth direction DR4 may be the opposite direction of the second direction DR2. Thus, each of the bridge electrodes CE may connect a pair of adjacent driving electrodes TE in the Y-axis direction.

For example, the driving electrodes TE, the sensing electrodes RE, and the dummy electrodes DME may be formed in a mesh or fishnet shape in a plan view. The driving electrodes TE, the sensing electrodes RE, and the dummy electrodes DME may surround a plurality of emission areas (EA1, EA2, and EA3) of each pixel group PG in a plan view. Thus, the driving electrodes TE, the sensing electrodes RE, and the dummy electrodes DME may not overlap with the emission areas (EA1, EA2, and EA3). In addition, the bridge electrodes BE may not overlap with the emission areas (EA1, EA2, and EA3) of each of the pixel groups PG. Accordingly, the display device 10 can prevent the luminance of light emitted from the emission areas (EA1, EA2, and EA3) from being lowered by the touch sensing unit TSU.

Each of the driving electrodes TE may include first and second portions TEa and TEb, which extend in the first and second directions DR1 and DR2, respectively. Each of the sensing electrodes RE may include first and second portions REa and REb, which extend in the first and second directions DR1 and DR2, respectively.

At least some of the touch electrodes SEN may include a code pattern part CDP. At least some of the driving electrodes TE or at least some of the sensing electrodes RE may include a code pattern part CDP. A code pattern part CDP may include a plurality of code patterns that are cut in accordance with a predetermined set of criteria and thus have location information. Each of the code patterns may correspond to a predefined data code. For example, each of the code patterns may be obtained by cutting one of a plurality of stems extended from a corresponding intersection between the touch electrodes SEN, but the present disclosure is not limited thereto. A plurality of stems may extend from an intersection between at least some of the touch electrodes SEN in the first, second, third, and fourth directions DR1, DR2, DR3, and DR4, and one of the plurality of stems may be cut. The direction of the cut stem may correspond to a predefined data code that forms location information. For example, a stem cut along the first direction DR1 may correspond to a first data code, a stem cut along the second direction DR2 may correspond to a second data code, a stem cut along the third direction DR3 may correspond to a third data code, and a stem cut along the fourth direction DR4 may correspond to a fourth data code. The first, second, third and fourth data codes may be different from each other.

Each of a plurality of pixels may include first, second, and third subpixels, which include first, second, and third emission areas EA1, EA2, and EA3, respectively. For example, the first emission area EA1 may emit first-color light or red light, the second emission area EA2 may emit second-color light or green light, and the third emission area EA3 may emit third-color light or blue light. However, the present disclosure is not limited to this example.

One pixel group PG may include one first emission area EA1, two second emission areas EA2, and one third emission area EA3 and may thereby display a white gradation. Thus, a white gradation may be displayed by the combination of light emitted from one first emission area EA1, light emitted from two second emission areas EA2, and light emitted from one third emission area EA3.

Figure 14:
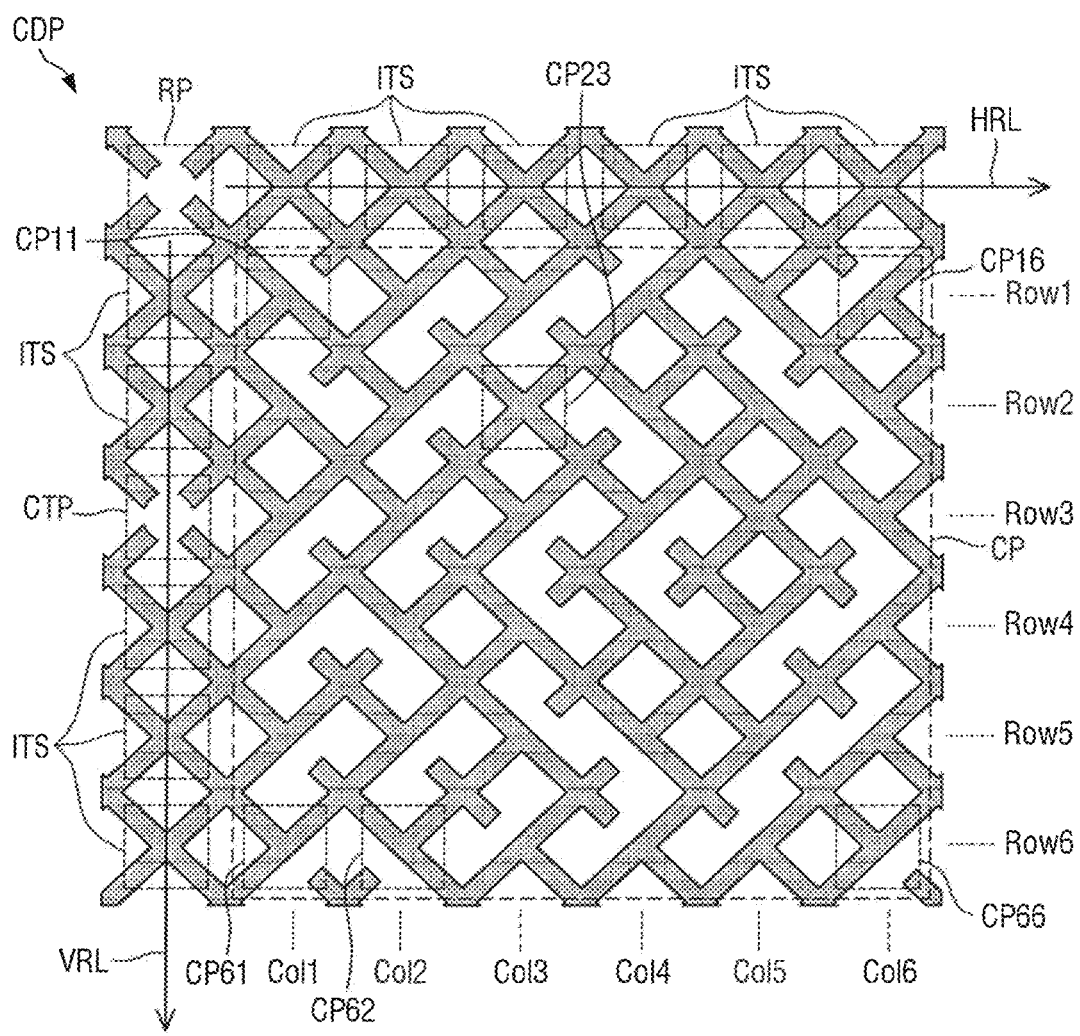
FIG. 14 is a plan view of a code pattern part of the display device of FIG. 1.
Figure 14:
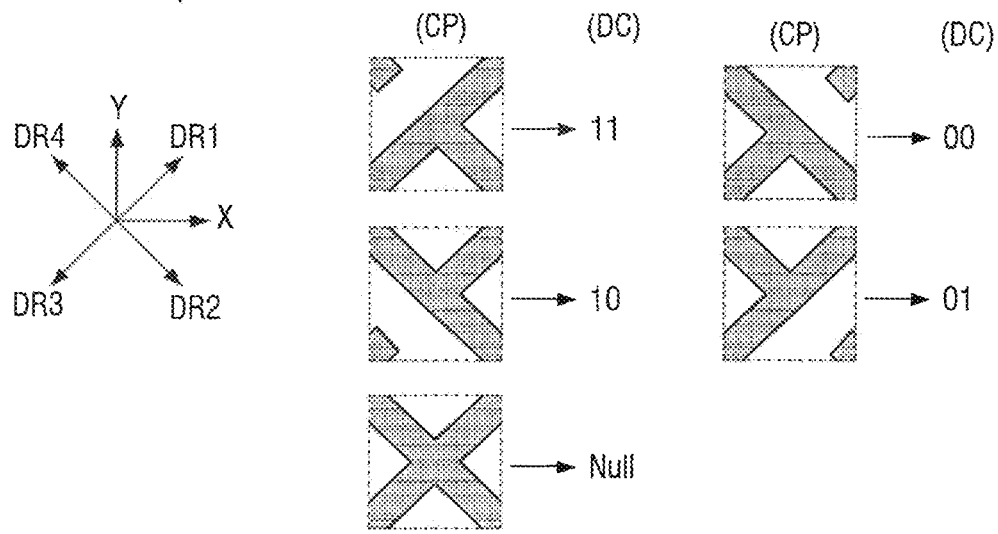

FIG. 14 is a plan view of a code pattern part of a display device according to an embodiment of the present disclosure. FIG. 15 is a table showing data codes corresponding to the code pattern part of FIG. 14.

Referring to FIGS. 14 and 15, a plurality of touch electrodes SEN may be formed in a mesh or fishnet shape in a plan view. The touch electrodes SEN may extend in the first and second directions DR1 and DR2 to intersect one another. At least some of the touch electrodes SEN may include a code pattern part CDP. At least some of a plurality of driving electrodes TE or at least some of a plurality of sensing electrodes RE may include a code pattern part CDP.

A code pattern part CDP may include a reference point RP, a first reference line HRL, a second reference line VRL, and a plurality of code patterns CP.

The reference point RP may be a criterion for the identification of the code pattern part CDP. For example, the reference point RP may be a cutout at an intersection between at least some of the touch electrodes SEN. For example, the reference point RP may be disposed in an upper left part of the code pattern part CDP, but the present disclosure is not limited thereto. For example, the reference point RP may be disposed in an upper right part of the code pattern part CDP.

The first reference line HRL may extend from the reference point RP in the X-axis direction. The first reference line HRL may be defined by connecting a plurality of intersection points ITS that are arranged in the X-axis direction with respect to the reference point RP. For example, in a case where the first reference line HRL is defined by connecting six intersection points ITS, the code patterns CP may be arranged in six columns, e.g., Col1-Col6, including the six intersection points ITS.

The second reference line VRL may extend from the reference point RP in the Y-axis direction. The second reference line VRL may be defined by connecting a plurality of intersection points ITS that are arranged in the Y-axis direction with respect to the reference point RP and a cutout part CTP disposed between the intersection points ITS. For example, in a case where the second reference line VRL is defined by connecting two intersection points ITS, one cutout part CTP, and three intersection points ITS, the code patterns CP may be arranged in six rows, e.g., Row1-Row3, including the five intersection points ITS and the cutout part CTP.

The code patterns CP may be disposed in a region defined by the first and second reference lines HRL and VRL. The slope or the rotation angle of the code patterns CP with respect to a camera may be determined based on the first and second reference lines HRL and VRL. For example, in a case where the first reference line HRL is defined by connecting six intersection points ITS and the second reference line VRL is defined by connecting two intersection points ITS, one cutout part CTP, and three intersection points ITS, the code patterns CP may be arranged in a 6×6 matrix.

Each of the code patterns CP may be cut in accordance with a predetermined set of criteria and may thus have location information. The code patterns CP may correspond to data codes DC. For example, each of the code patterns CP may be obtained by cutting one of a plurality of stems extended from a corresponding intersection between at least some of the touch electrodes SEN. A plurality of stems may extend from an intersection between at least some of the touch electrodes SEN in the first, second, third, and fourth directions DR1, DR2, DR3, and DR4, and one of the plurality of stems may be cut. The direction of the cut stem may correspond to a predefined data code DC that forms location information. For example, a code pattern CP in an m-th row (where m is a natural number) and an n-th column (where n is a natural number) of the code pattern part CDP may correspond to a data code DC in an m-th row and an n-th column of the table of FIG. 15.

For example, a code pattern CP having a stem in the first direction DR1 cut may correspond to a data code DC of [00], a code pattern CP having a stem in the second direction DR2 cut may correspond to a data code DC of [01], a code pattern CP having a stem in the third direction DR3 cut may correspond to a data code DC of [10], and a code pattern CP having a stem in the fourth direction DR4 cut may correspond to a data code DC of [11]. A non-cut full pattern may not have a value, e.g., Null.

Code pattern 11 "CP11" in a first row Row1 and a first column Col1 may have a stem in the first direction DR1 cut, and data code 11 "DC11" may have a value of [00]. When the stem in the first direction DR1 is cut, the upper right hand portion of the code pattern CP may include the cut stem. Code pattern 61 "CP61" in a sixth row Row6 and the first column Col1 may have a stem in the second direction DR2 cut, and data code 61 "DC61" may have a value of [01]. When the stem in the second direction DR2 is cut, the lower right hand portion of the code pattern CP may include the cut stem. Code pattern 62 "CP62" in the sixth row Row6 and a second column Col2 may have a stem in the third direction DR3 cut, and data code 62 "DC62" may have a value of [10]. When the stem in the third direction DR3 is cut, the lower left hand portion of the code pattern CP may include the cut stem. Code pattern 16 "CP16" in the first row Row1 and a sixth column Col6 may have a stem in the fourth direction DR4 cut, and data code 16 "DC16" may have a value of [11]. When the stem in the fourth direction DR4 is cut, the upper left hand portion of the code pattern CP may include the cut stem. Code pattern 66 "CP66" in the sixth row Row6 and the sixth column Col6 may have a stem in the second direction DR2 cut, and data code 16 "DC66" may have a value of [01].

The code patterns CP may further include a non-cut full pattern having none of the stems extended from a corresponding intersection between the touch electrodes SEN cut. The non-cut full pattern may not have a data code value. The non-cut full pattern may be disposed at any location to allow the touch electrodes SEN to perform a touch operation properly. As the code patterns CP include the non-cut full pattern, the deterioration of the touch electrodes SEN can be prevented. For example, code pattern 23 "CP23" in the second row Row2 and a third column Col3 may correspond to a non-cut full pattern, and data code 23 "DC23" may not have any value ("Null").

As the display device 10 includes a plurality of code patterns CP provided in at least some of the touch electrodes SEN, touch input can be received from a touch input device such as the smart pen 20. Each of the code patterns CP may be cut in accordance with a predetermined set of criteria to have location information and may correspond one-to-one to a predefined data code DC. Thus, since the display device 10 can receive coordinate data generated using data codes DC, without a requirement of a complicated computation/correction process, the display device 10 can reduce cost and power consumption and can simplify a driving process thereof. In addition, since the display device 10 includes a plurality of code patterns CP provided in at least some of the touch electrodes SEN, the display device 10 can be applied to nearly all types of electronic devices having a touch function without any size limitations.

Figure 16:
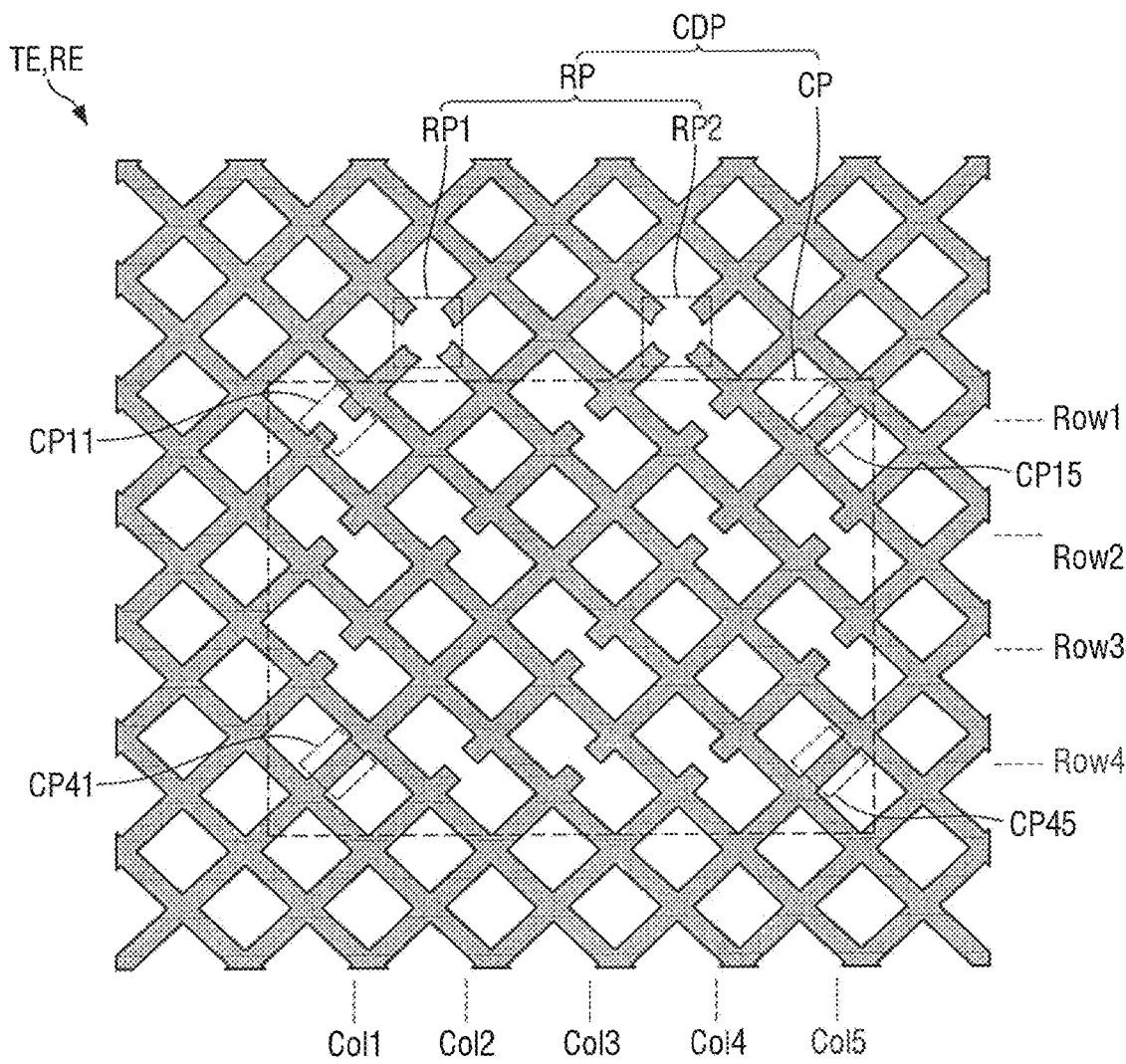
FIG. 16 is a plan view of another code pattern part of the display device of FIG. 1.
Figure 16:
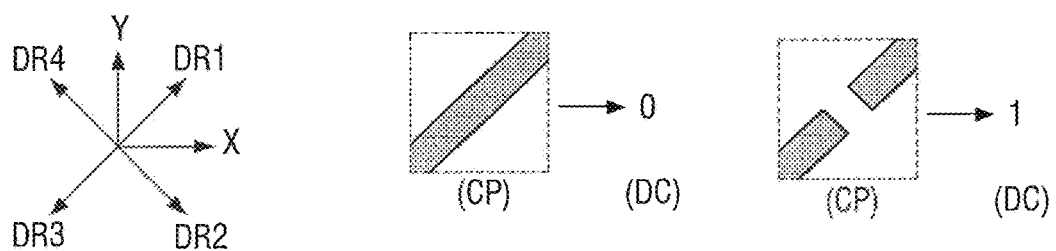
Figure 17:
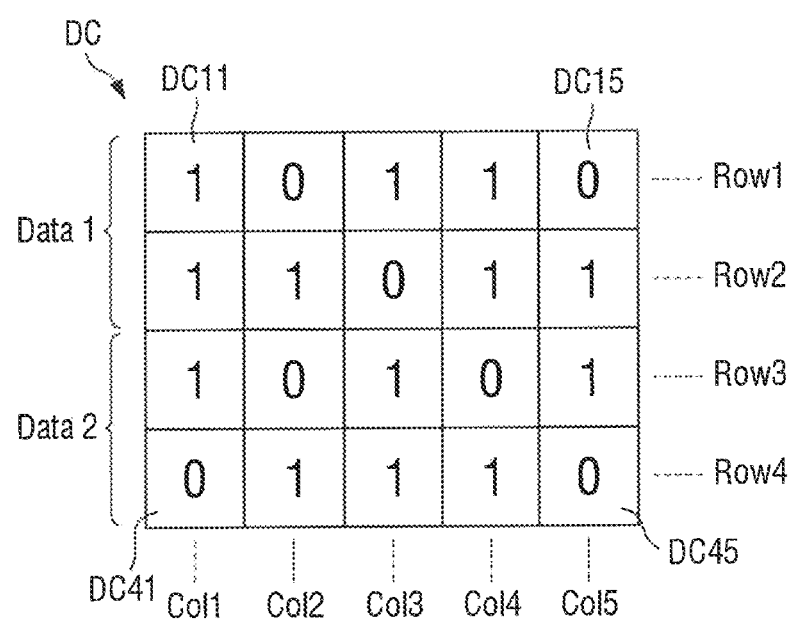

FIG. 16 is a plan view of another code pattern part of the display device of FIG. 1, and FIG. 17 is a table showing data codes corresponding to the code pattern part of FIG. 16.

Referring to FIGS. 16 and 17, a plurality of touch electrodes SEN may be formed in a mesh or fishnet shape in a plan view. The minimal-unit sides of each of the touch electrodes SEN may extend in the first and second directions DR1 and DR2 to intersect one another. At least some of the touch electrodes SEN may include a code pattern part CDP. At least some of a plurality of driving electrodes TE or at least some of a plurality of sensing electrodes RE may include a code pattern part CDP.

A code pattern part CDP may include reference points RP and a plurality of code patterns CP.

The reference points RP may be a criterion for the identification of the code pattern part CDP. For example, the reference points RP may be cutouts at intersections between at least some of the touch electrodes SEN. The reference points RP may include first and second reference points RP1 and RP2. For example, the first and second reference points RP1 and RP2 may be disposed above the code patterns CP and spaced apart from each other, but the present disclosure is not limited thereto.

The code patterns CP may be disposed in a region defined by the first and second reference points RP1 and RP2. The slope or the rotation angle of the code patterns CP with respect to a camera may be determined based on the first and second reference lines HRL and VRL. For example, in a case where the first and second reference points RP1 and RP2 are spaced apart from each other in a particular row, the code patterns CP may be arranged in rows subsequent to the particular row in an m×n matrix. In other words, the code patterns CP may be arranged in a first row Row1 underneath the row in which the first and second reference points RP1 and RP2 are provided.

Each of the code patterns CP may be cut in accordance with a predetermined set of criteria and may thus have location information. The code patterns CP may correspond to data codes DC. For example, the code patterns CP may include sides that are not cut and sides that are cut, among a plurality of sides that form the mesh shape of the code pattern part CDP together. Here, each of the code patterns CP may have a side thereof cut in the middle, but the location where the side of each of the code patterns CP is cut is not particularly limited. The presence of a cutout on the side of each of the code patterns CP may correspond to a data code DC. For example, a code pattern CP in an m-th row and an n-th column of the code pattern part CDP may correspond to a data code DC in an m-th row and an n-th column of the table of FIG. 17. For example, a code pattern CP having a side not cut may correspond to a data code DC of [0], and a code pattern CP having a side cut may correspond to a data code DC of [1].

Code pattern 11 "CP11" in a first row Row1 and a first column Col1 may have a side cut, and data code 11 "DC11" may have a value of [1]. Code pattern 45 "CP45" in a fourth row Row4 and a fifth column Col5 may not have a side cut, and data code 45 "DC45" may have a value of [0]. Code pattern 15 "CP15" in the first row Row1 and the fifth column Col5 may not have a side cut, and data code 15 "DC15" may have a value of [0]. Code pattern 41 "CP41" in the fourth row Row4 and the first column Col1 may not have a side cut, and data code 41 "DC41" may have a value of [0].

Data codes DC in some rows of the table of FIG. 17 may form first data Data1 of coordinate data, and data codes DC in the other rows may form second data Data2 of the coordinate data. For example, the first data Data1 may correspond to the X-axis coordinate of a touch location, and the second data Data2 may correspond to the Y-axis coordinate of the touch location. However, the present disclosure is not limited to this example.

For example, data codes DC in first and second rows Row1 and Row2 of the table of FIG. 17 may form the first data Data1, and data codes in third and fourth rows Row3 and Row4 of the table of FIG. 17 may form the second data Data2. Thus, the code patterns CP can be converted into data codes DC, and coordinate data can be quickly generated based on the data codes DC, without using a complicated computation/correction process.

Since the display device 10 includes a plurality of code patterns CP provided in some of the touch electrodes SEN, touch input can be received from a touch input device such as a smart pen. Each of the code patterns CP may be cut in accordance with a predetermined set of criteria to have location information and may correspond one-to-one to a predefined data code DC. Thus, since the display device 10 can receive coordinate data generated using data codes DC, without using a complicated computation/correction process, the display device 10 can reduce cost and power consumption and can simplify a driving process thereof. In addition, since the display device 10 includes a plurality of code patterns CP provided in at least some of the touch electrodes SEN, the display device 10 can be applied to nearly all types of electronic devices having a touch function without any size limitations.

Figure 18:
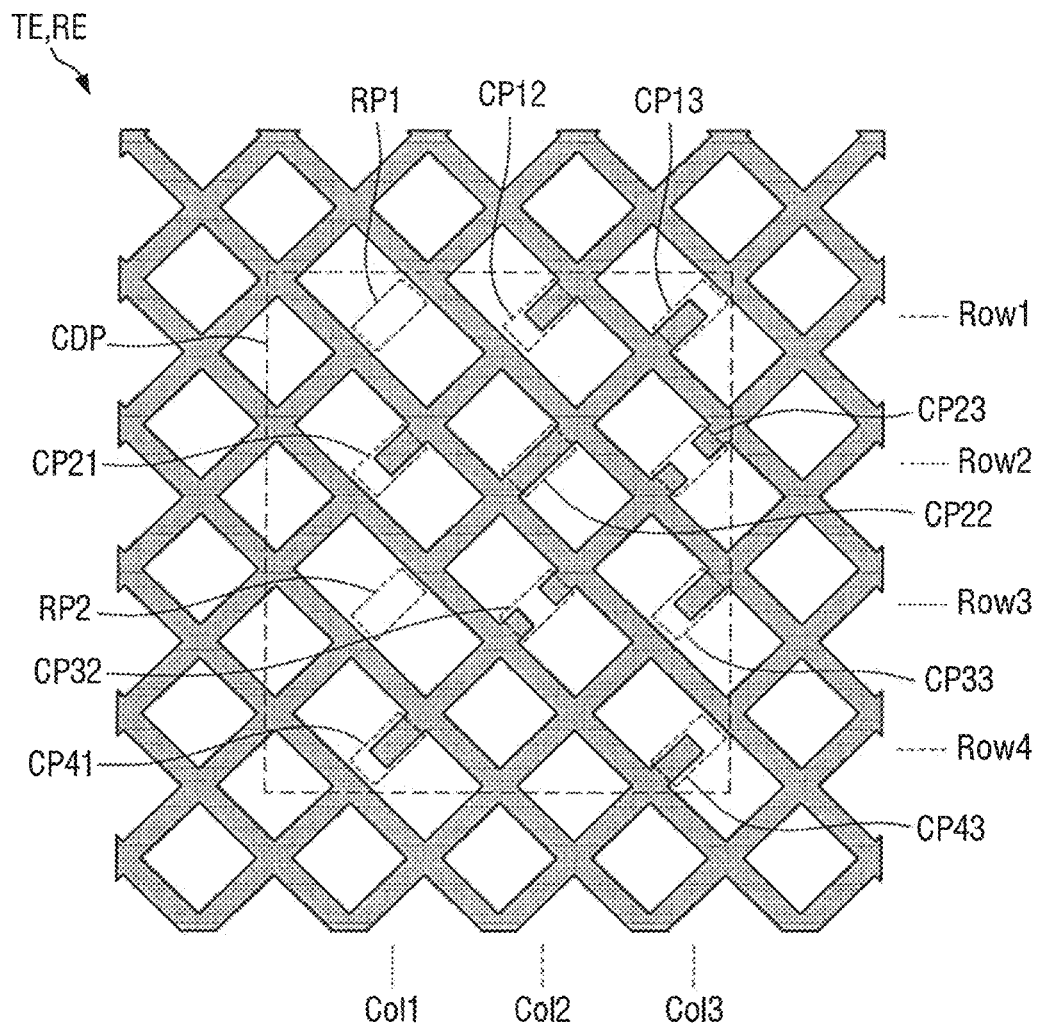
FIG. 18 is a plan view of another code pattern part of the display device of FIG. 1.
Figure 18:
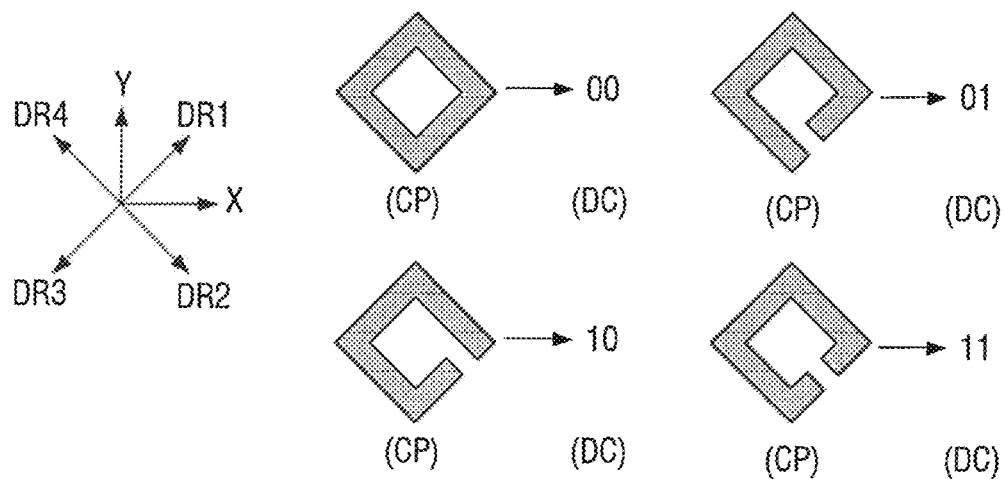

FIG. 18 is a plan view of another code pattern part of the display device of FIG. 1, and FIG. 19 is a table showing data codes corresponding to the code pattern part of FIG. 18.

Referring to FIGS. 18 and 19, a plurality of touch electrodes SEN may be formed in a mesh or fishnet shape in a plan view. The minimal-unit sides of each of the touch electrodes SEN may extend in the first and second directions DR1 and DR2 to intersect one another. At least some of the touch electrodes SEN may include a code pattern part CDP. At least some of a plurality of driving electrodes TE or at least some of sensing electrodes RE may include a code pattern part CDP.

A code pattern part CDP may include reference points RP and a plurality of code patterns CP.

The reference points RP may be a criterion for the identification of the code pattern part CDP. For example, the reference points RP may correspond to sides that are completely cut out, among a plurality of sides that form a mesh shape together. The reference points RP may include first and second reference points RP1 and RP2. The first and second reference points RP1 and RP2 may be arranged in rows and columns where the code patterns CP are arranged. For example, in a case where the code pattern part CDP is arranged in a 4×3 matrix, the first reference point RP1 may be arranged in a first row Row1 and a first column Col1, the second reference point RP2 may be arranged in a third row Row3 and the first column Col1, and the code patterns Cp may be arranged in the other rows and the other columns. However, the present disclosure is not limited to this example.

The code patterns CP may be disposed in a region defined by the first and second reference points RP1 and RP2. The slope or the rotation angle of the code patterns CP with respect to a camera may be determined based on the first and second reference lines HRL and VRL.

Each of the code patterns CP may be cut in accordance with a predetermined set of criteria and may thus have location information. The code patterns CP may correspond to data codes DC. For example, each of the code patterns CP may have a particular part of a side thereof cut. The locations where sides of the code patterns CP are cut may correspond to data codes DC that form location information. For example, a code pattern CP in an m-th row and an n-th column of the code pattern part CDP may correspond to a data code DC in an m-th row and an n-th column of the table of FIG. 19.

For example, a code pattern CP having no cutout may correspond to a data code DC of [00], a code pattern CP having a cutout in a lower part of a side thereof in the first direction DR1 may correspond to a data code DC of [01], a code pattern CP having a cutout in an upper part of a side thereof in the first direction DR1 may correspond to a data code DC of [10], and a code pattern CP having a cutout in the middle of a side thereof in the first direction DR1 may correspond to a data code DC of [11].

Code pattern 22 "CP22" in a second row Row2 and a second column Col2 may not have a cutout, and data code 22 "DC22" may have a value of [00]. Code pattern 12 "CP12" in a first row Row1 and the second column Col2 may have a cutout in the lower part of a side thereof, and data code 12 "DC12" may have a value of [01]. Code pattern 13 "CP13" in the first row Row1 and a third column Col3 may have a cutout in the upper part of a side thereof, and data code 13 "DC13" may have a value of [10]. Code pattern 23 "CP23" in the second row Row2 and the third column Col3 may have a cutout in the middle part of a side thereof, and data code 23 "DC23" may have a value of [11]. Code pattern 21 "CP21", code pattern 41 "CP41" and code pattern 33 "CP33" may have the same cutout as the code pattern 12 "CP12" and thus each have a data code with a value of [01]. Code pattern 43 "CP43" may have the same cutout as the code pattern 13 "CP13" and thus have a data code with a value of [10]. Code pattern 32 "CP32" may have the same cutout as the code pattern 23 "CP23" and thus have a data code with a value of [11].

Data codes DC in some rows of the table of FIG. 19 may form first data Data1 of coordinate data, and data codes DC in the other rows may form second data Data2 of the coordinate data. For example, the first data Data1 may correspond to the X-axis coordinate of a touch location, and the second data Data2 may correspond to the Y-axis coordinate of the touch location. However, the present disclosure is not limited to this example.

For example, data codes DC in first and second rows Row1 and Row2 of the table of FIG. 19 may form the first data Data1, and data codes DC in third and fourth rows Row3 and Row4 of the table of FIG. 19 may form the second data Data2. Thus, the code patterns CP can be converted into data codes DC, and coordinate data can be quickly generated based on the data codes DC, without using a complicated computation/correction process.

Since the display device 10 includes a plurality of code patterns CP provided in some of the touch electrodes SEN, touch input can be received from a touch input device such as a smart pen. Each of the code patterns CP may be cut in accordance with a predetermined set of criteria to have location information and may correspond one-to-one to a predefined data code DC. Thus, since the display device 10 can receive coordinate data generated using data codes DC, without a complicated computation/correction process, the display device 10 can reduce cost and power consumption and can simplify a driving process thereof. In addition, since the display device 10 includes a plurality of code patterns CP provided in at least some of the touch electrodes SEN, the display device 10 can be applied to nearly all types of electronic devices having a touch function without any size limitations.

In concluding the detailed description, those skilled in the art will appreciate that many variations and modifications can be made to the embodiments set forth herein without substantially departing from the scope of the present disclosure. Therefore, the disclosed embodiments are used in descriptive sense and not for purposes of limitation.

What is claimed is:

1. A smart pen, comprising:
a body part;
a nib part at an end of the body part;
a code detection unit for receiving light reflected from a display panel and the nib part, wherein the light reflected from the display panel and the nib part is used to detect shape data for code patterns of the display panel; and
a code processor for generating coordinate data based on the shape data and transmitting the coordinate data to a main processor for driving the display panel based on the coordinate data,
wherein the code detection unit includes a light emitter, which emits infrared (IR) light using at least one IR light source, and a light receiver, which detects IR light, reflected from the code patterns of the display panel, via an IR camera.

2. The smart pen of claim 1, wherein the code processor extracts or generates data codes corresponding to a structure or shape of the code patterns from a memory, combines the data codes, and extracts or generates coordinate data corresponding to the combined data codes.

3. The smart pen of claim 2, wherein the memory stores the data codes and coordinate data for combinations of the data codes.

4. The smart pen of claim 1, wherein the nib part includes a reflective surface.

5. The smart pen of claim 4, wherein the reflective surface is formed in the shape of an inverted triangle, a polygon of than the inverted triangle, a circle, an ellipse, or a nib of a fountain pen.

6. The smart pen of claim 4, wherein the nib part includes a hole for outputting infrared (IR) light emitted from the code detection unit and receiving light reflected from the reflective surface.

7. The smart pen of claim 4, wherein the reflective surface is an infrared (IR) reflector or is coated with an (IR) reflector.

8. The smart pen of claim 4, wherein a reflective width of the reflective surface of the nib part s the same as, or greater than, a thickness or width of the body part.

9. The smart pen of claim 4, wherein the reflective surface of the nib part includes a first reflective surface, which has a concave surface with a first curvature, and a second reflective surface, which has a concave surface with a second curvature greater than the first curvature.

10. The smart pen of claim 9, wherein a reflective width of the first reflective surface is the same as, or greater than, a thickness or width of the body part.

11. The smart pen of claim 9, wherein the reflective surface of the nib part is an infrared (IR) reflector or is coated with an IR reflector.

12. A display device, comprising:
a display panel including code patterns;
a main processor for driving the display panel to display an image; and
a smart pen for receiving light reflected from the display panel to detect shape data for the code patterns, the smart pen generating coordinate data for the shape data and transmitting the coordinate data to the main processor,
wherein the smart pen includes a body part, a nib part formed at an end of the body part, a code detection unit for receiving the light reflected from the display panel and light reflected from the nib part to detect the shape data for the code patterns, and a code processor for generating the coordinate data based on the shape data and transmitting the coordinate data to the main processor,
wherein the code detection unit includes a light emitter, which emits infrared (IR) light using at least one IR light source, and a light receiver, which detects IR light, reflected from the code patterns of the display panel, via an IR camera.

13. The display device of claim 12, wherein the nib part includes a reflective surface.

14. The display device of claim 13, wherein the reflective surface is formed in the shape of an inverted triangle, a polygon other than the inverted triangle, a circle, an ellipse, or a nib of a fountain pen.

15. The display device of claim 12, wherein the display panel includes a plurality of touch electrodes for detecting touch input and a code pattern part which includes code patterns obtained by cutting at least some of the touch electrodes in accordance with a predefined set of criteria to have location information.

16. The display device of claim 15, wherein
the code pattern part includes a reference point, which is used to identify the code pattern part, a first reference line, which extends in a first direction from the reference point, and a second reference line, which extends in a second direction, intersecting the first direction, from the reference point, and
the code patterns are disposed in an area formed by the first and second reference lines.

17. The display device of claim 16, wherein the reference point corresponds to a cutout at an intersection between the at least some of the touch electrodes.

18. The display device of claim 16, wherein the first reference line is formed by connecting a plurality of intersection points that are arranged in the first direction with respect to the reference point.

19. An electronic pen, comprising:
- a body part;
- a nib part at an end of the body part, the nib part including a reflective surface and an opening;
- a code detection unit for receiving light reflected from a display panel and the reflective surface of the nib through the opening, wherein the code detection unit generates shape data of code patterns in the display panel based on the light reflected from the display panel and the reflective surface; and
- a code processor for generating coordinate data based on the shape data and transmitting the coordinate data to a main processor for driving the display panel based on the coordinate data,
- wherein the code detection unit includes a light emitter, which emits infrared (IR) light using at least one IR light source, and a light receiver, which detects IR light, reflected from the code patterns of the display panel, via an IR camera.

20. The electronic pen of claim 19, wherein the code detection unit outputs light to the display panel through the opening of the nib part.

21. The electronic pen of claim 19, wherein the opening is spaced apart from a tip of the nib part.

\* \* \* \* \*